Aug. 18, 1959  H. L. THOLSTRUP  2,900,066
CARRIAGE CONTROL MECHANISM FOR POWER DRIVEN PRINTER
Filed Oct. 4, 1956  22 Sheets-Sheet 2

INVENTOR.
HENRY L. THOLSTRUP
BY
ATTORNEY

Aug. 18, 1959     H. L. THOLSTRUP     2,900,066
CARRIAGE CONTROL MECHANISM FOR POWER DRIVEN PRINTER

Filed Oct. 4, 1956     22 Sheets—Sheet 5

INVENTOR.
HENRY L. THOLSTRUP
BY
ATTORNEY

Aug. 18, 1959  H. L. THOLSTRUP  2,900,066
CARRIAGE CONTROL MECHANISM FOR POWER DRIVEN PRINTER
Filed Oct. 4, 1956  22 Sheets-Sheet 6

INVENTOR.
HENRY L. THOLSTRUP
BY
ATTORNEY

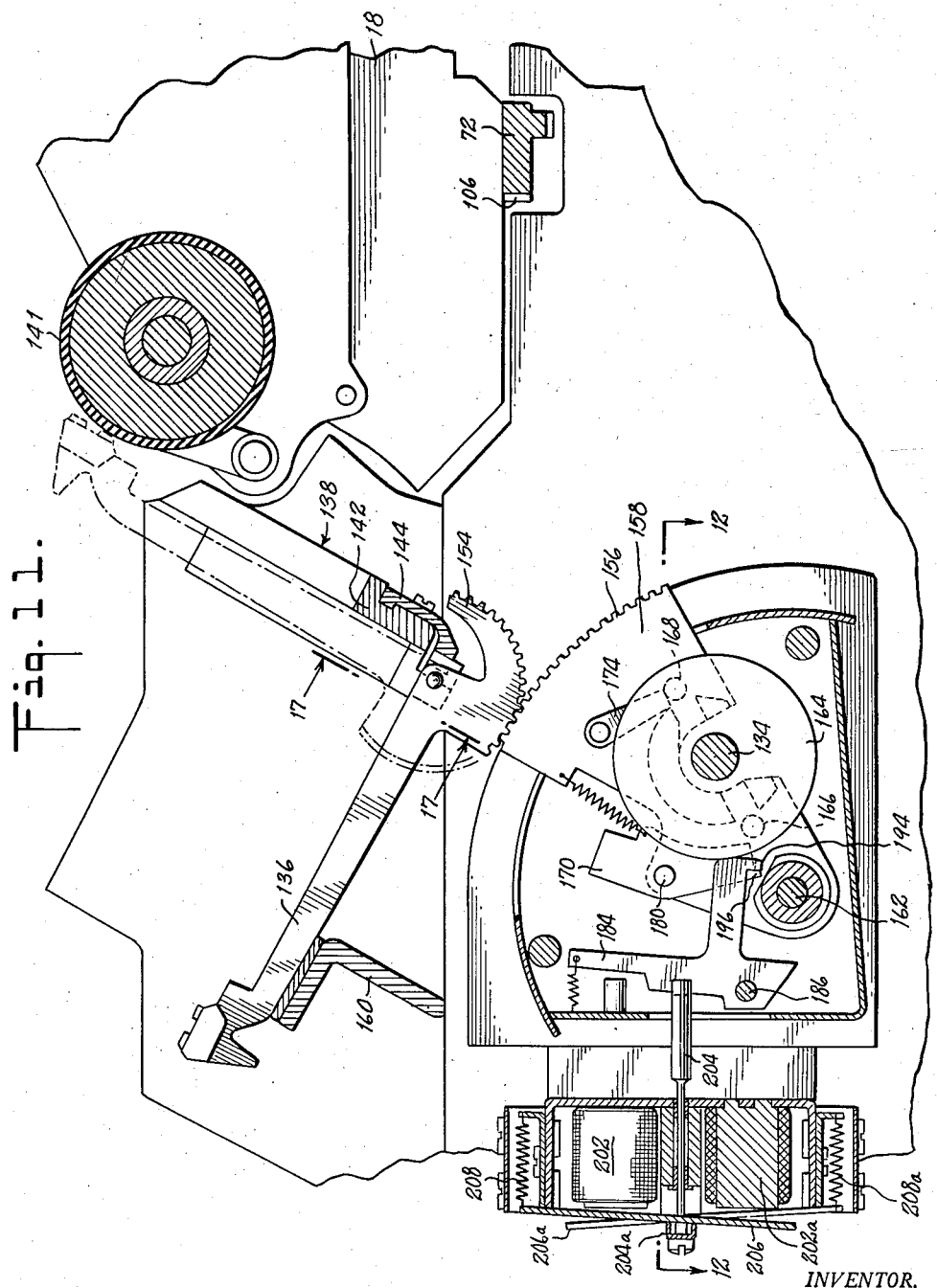

Aug. 18, 1959 H. L. THOLSTRUP 2,900,066
CARRIAGE CONTROL MECHANISM FOR POWER DRIVEN PRINTER
Filed Oct. 4, 1956 22 Sheets-Sheet 8
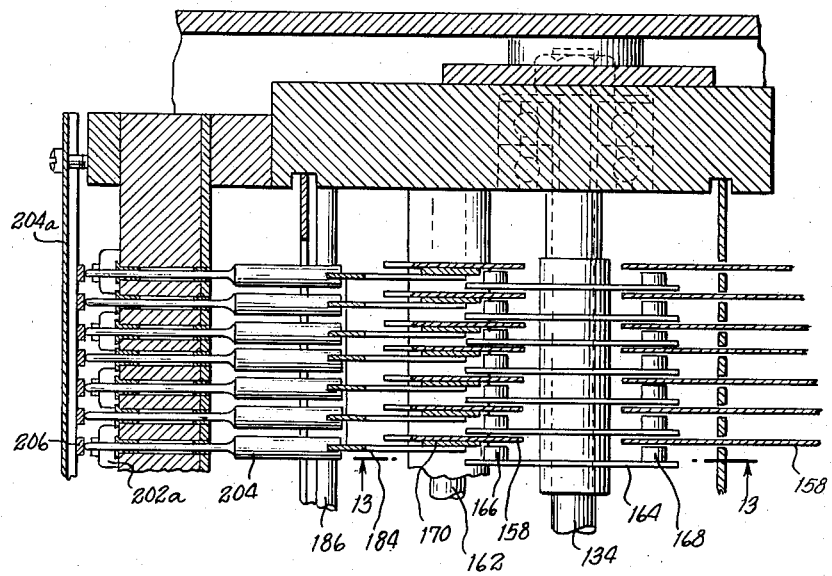
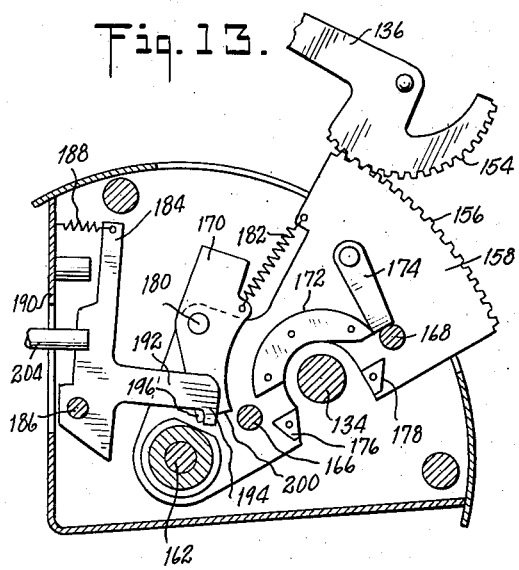 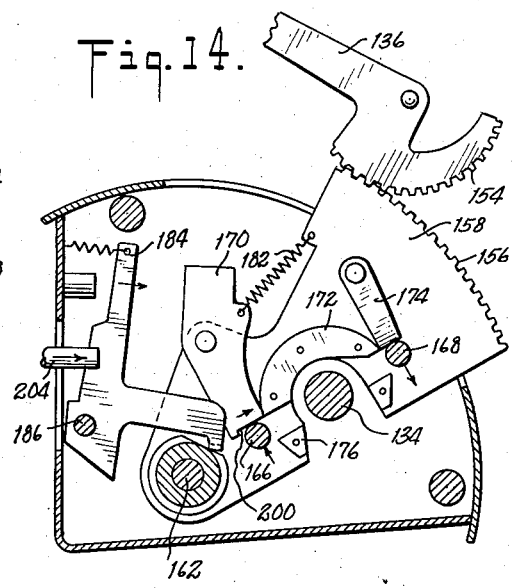
INVENTOR.
HENRY L. THOLSTRUP
BY
ATTORNEY

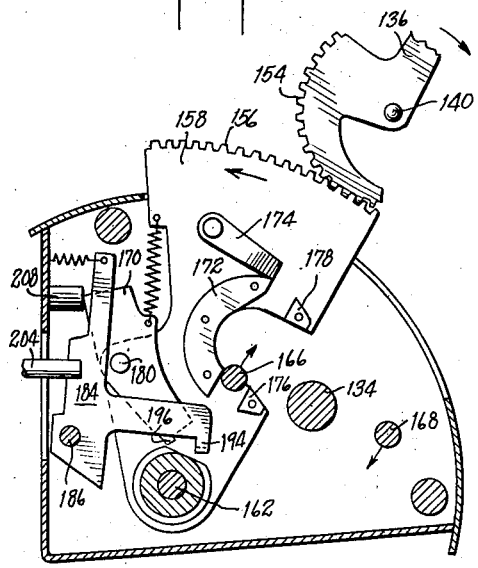
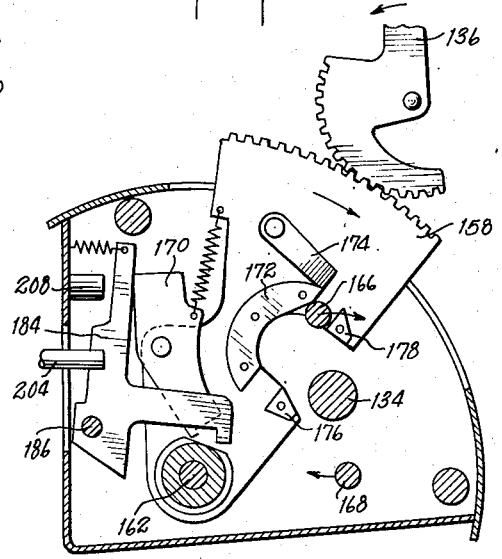
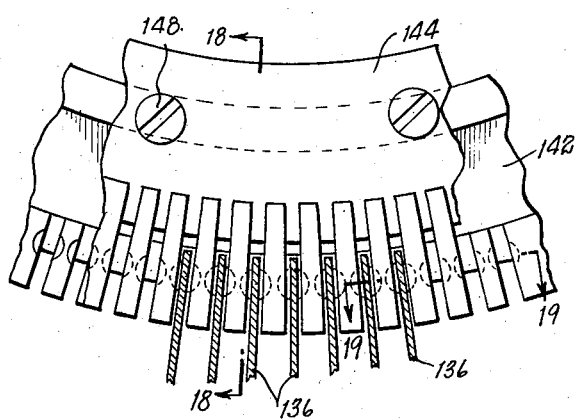
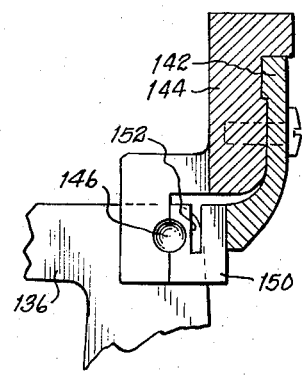
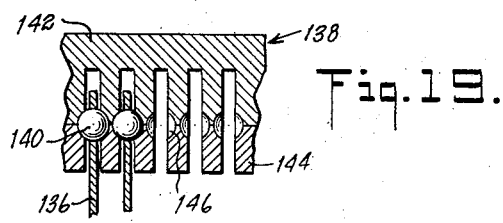
INVENTOR.
HENRY L. THOLSTRUP
BY
ATTORNEY

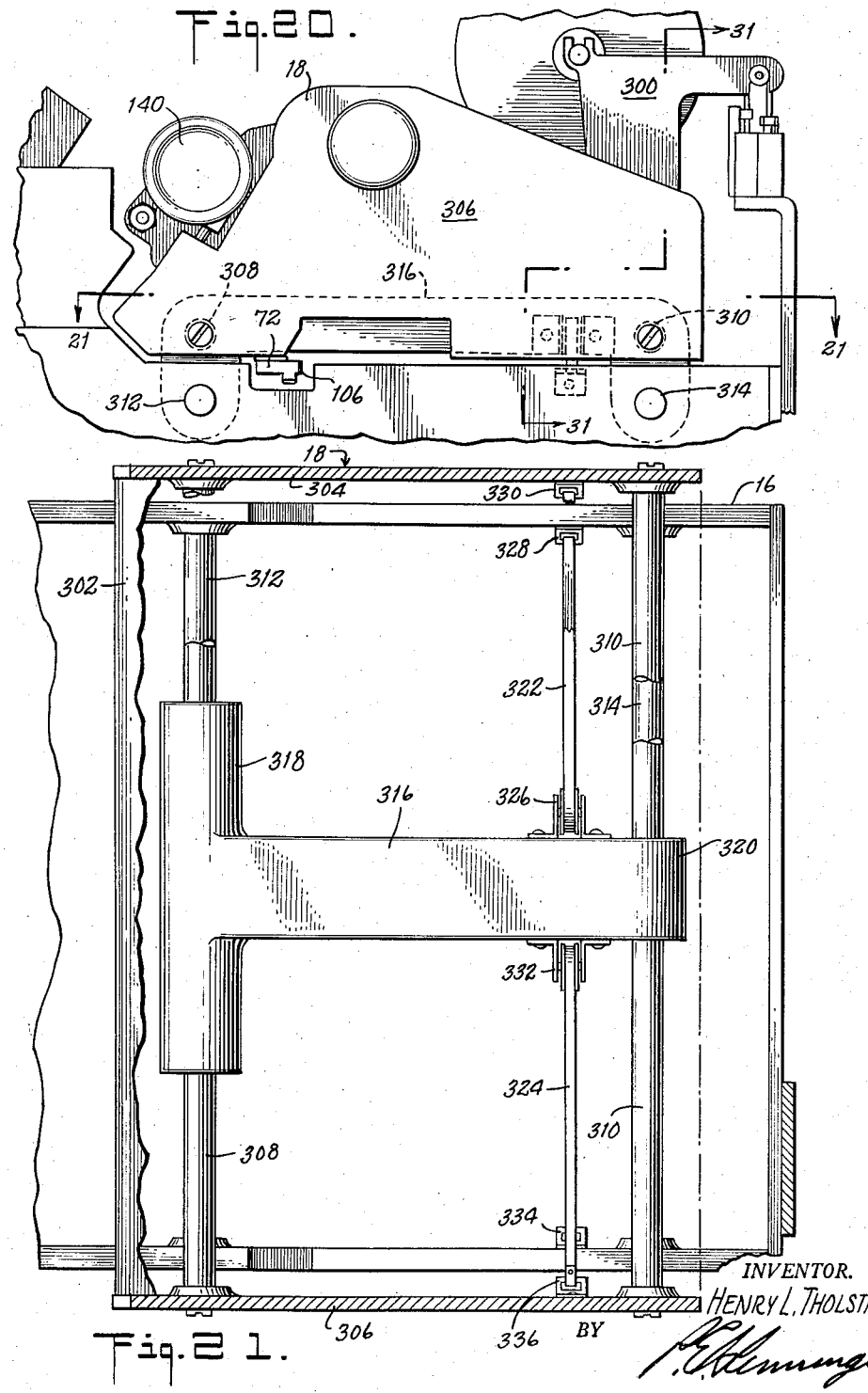

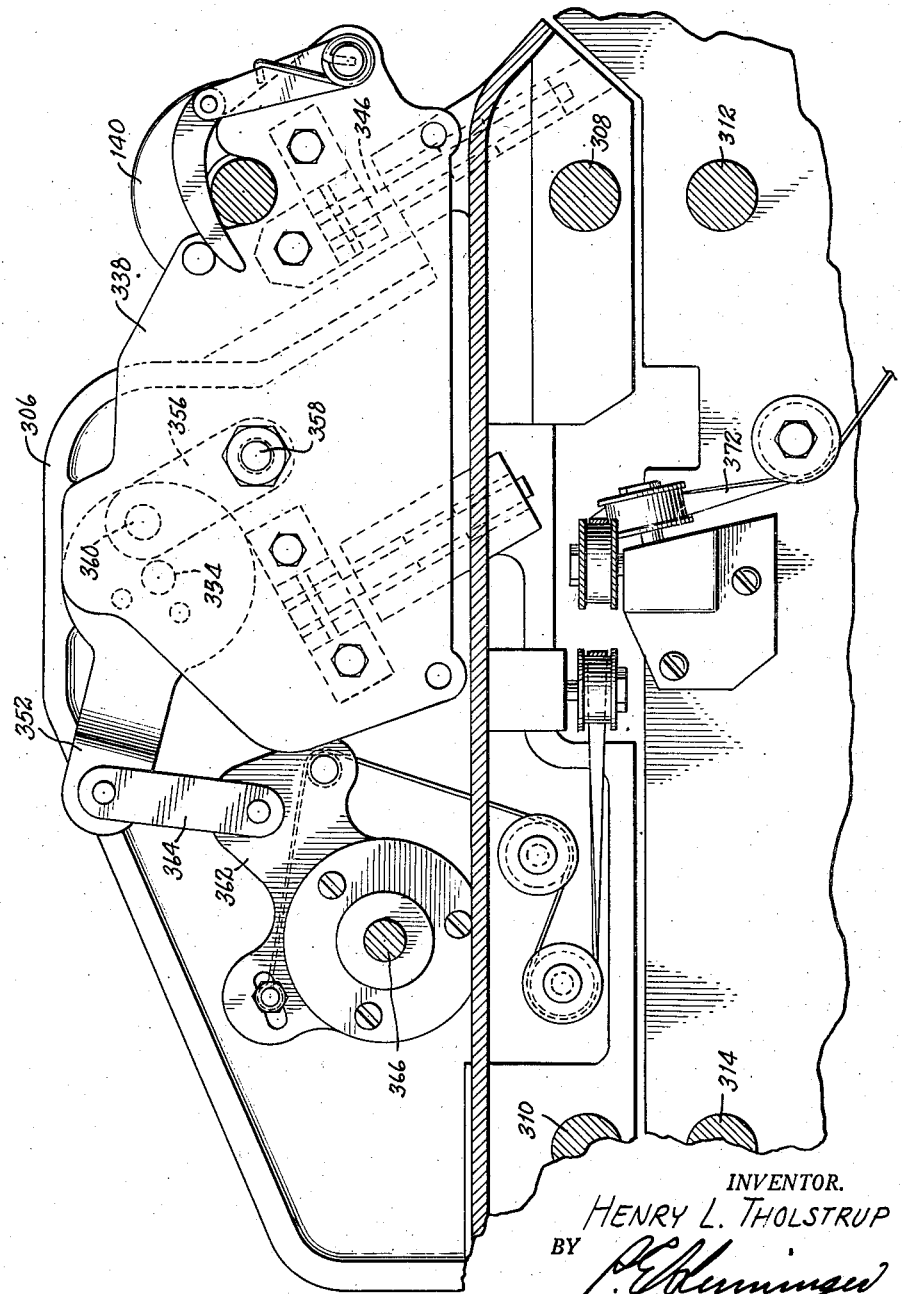

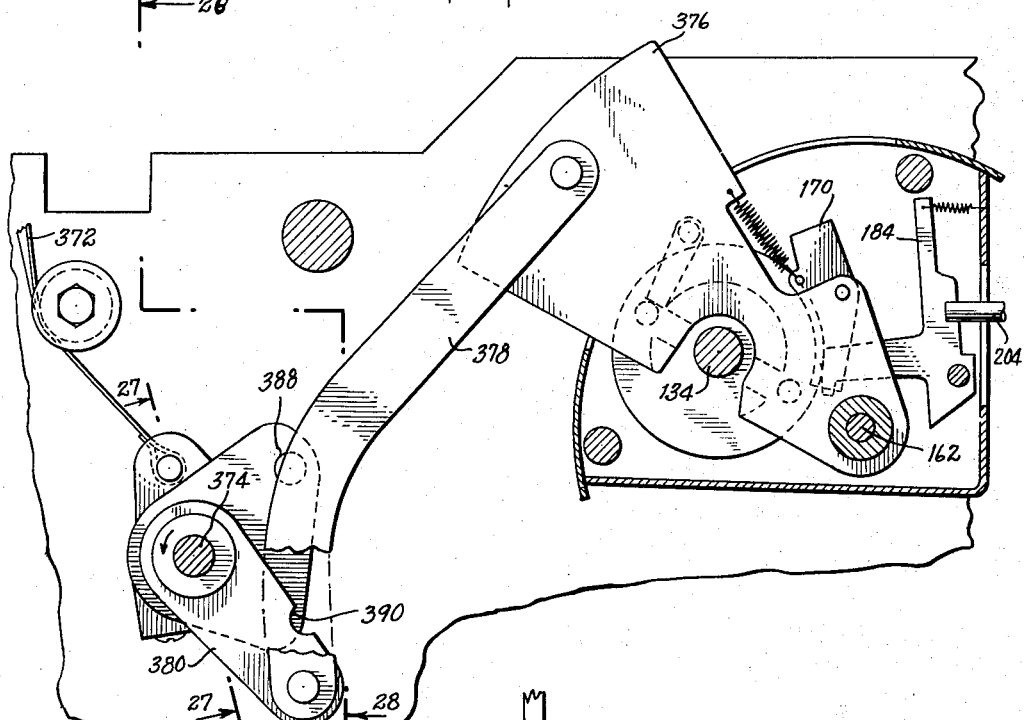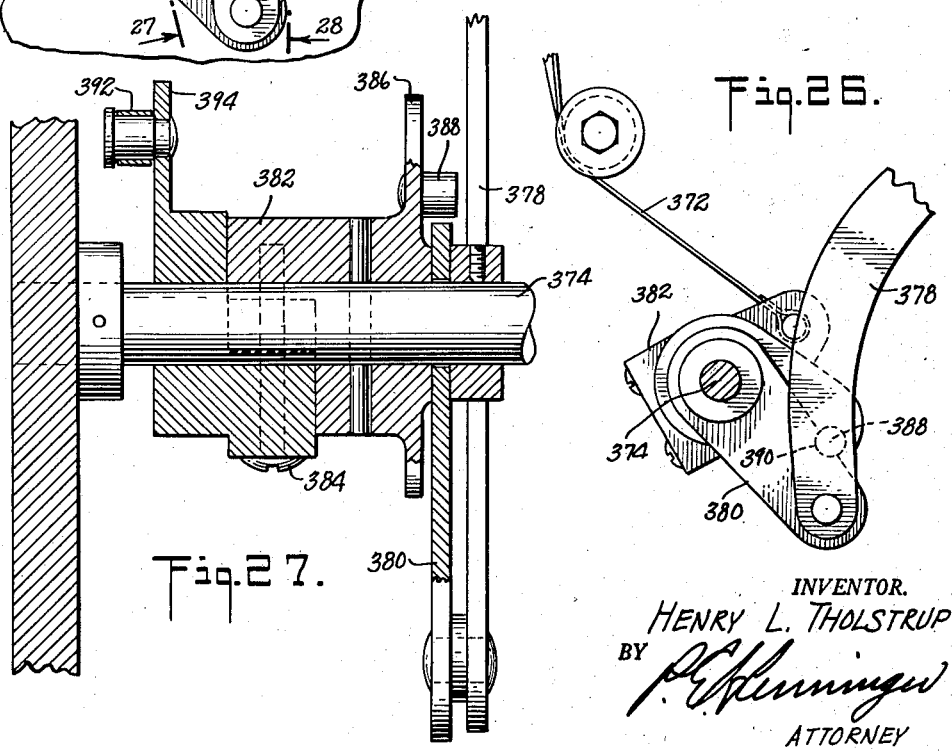

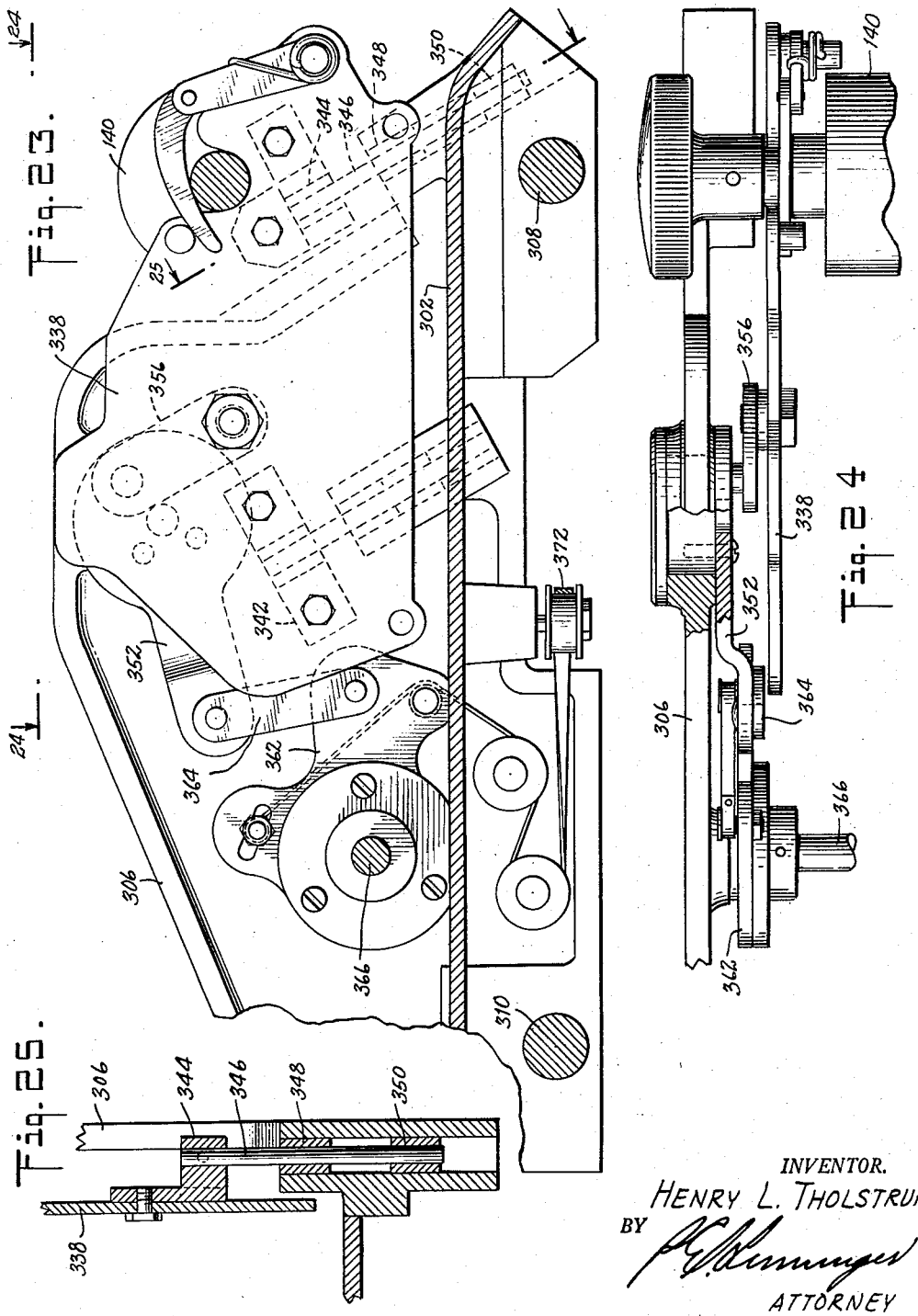

Aug. 18, 1959 H. L. THOLSTRUP 2,900,066
CARRIAGE CONTROL MECHANISM FOR POWER DRIVEN PRINTER
Filed Oct. 4, 1956 22 Sheets-Sheet 14

INVENTOR.
HENRY L. THOLSTRUP
BY
ATTORNEY

INVENTOR.
HENRY L. THOLSTRUP
BY
ATTORNEY

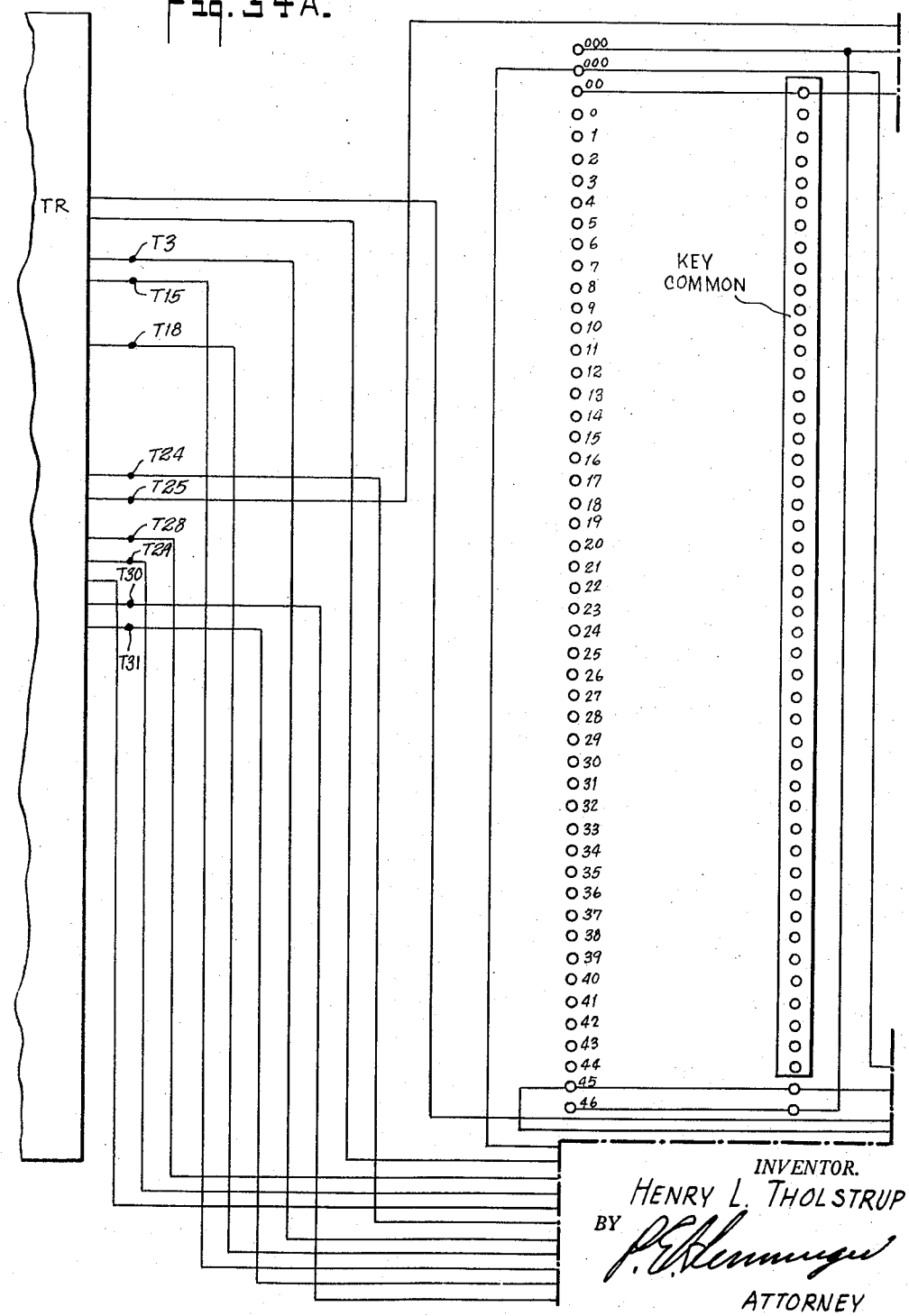

Aug. 18, 1959   H. L. THOLSTRUP   2,900,066
CARRIAGE CONTROL MECHANISM FOR POWER DRIVEN PRINTER
Filed Oct. 4, 1956   22 Sheets-Sheet 19

INVENTOR.
HENRY L. THOLSTRUP
BY
ATTORNEY

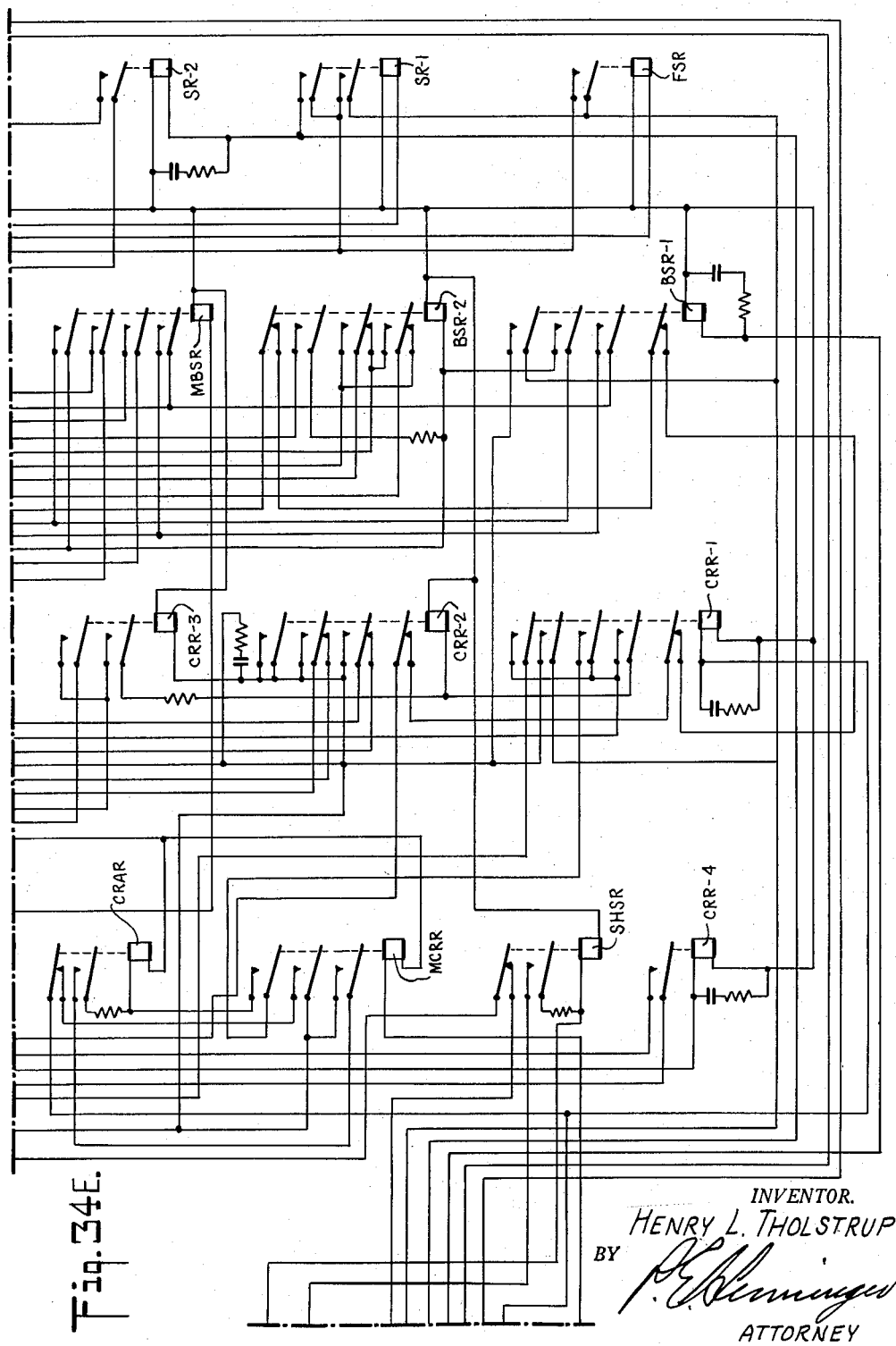

United States Patent Office 2,900,066
Patented Aug. 18, 1959

2,900,066

CARRIAGE CONTROL MECHANISM FOR POWER DRIVEN PRINTER

Henry L. Tholstrup, Rochester, N.Y., assignor to Commercial Controls Corporation, Rochester, N.Y., a corporation of Delaware Application October 4, 1956, Serial No. 613,877

7 Claims. (Cl. 197—82)

This invention relates to carriage control mechanism for power operated character-by-character printer.

It is the main object of the invention to provide a printer of the power operated typewriter class, in which the printing operation and the functions attendant thereon are performed at much greater speed than obtainable in machines of the same class now available.

The speed at which a printer of the power operated typewriter class can be operated is dependent upon the time required to perform the various functions of such machines. In the average printer of this class, the type bar speed is 115 milliseconds, the return of the carriage (100 spaces) consumes 575 milliseconds, tabulation (50 spaces) requires 455 milliseconds, case shifting consumes 85 milliseconds, and a back spacing operation can be performed in no less than 125 milliseconds with the result that the average copy can be composed at a maximum rate of not more than 12 characters per second. Simply to increase the speed of such conventional printers, considering kinetic energies involved, would merely increase the frequency of service calls and shorten the ultimate life of the machine.

It is, therefore, the object of this invention to provide a printer which may be operated at much higher speed than heretofore possible without imposing still higher impact loads on the type bars and greater strain on other moving functional parts.

The objectives of the invention are accomplished by providing a positive drive for the type levers, carriage, etc., thus overcoming acceleration lags inherent in machines in which type lever action is merely power initiated and in which the return movement is under the influence of gravity or light spring tension, or in which carriage movement is merely under control of springs.

By providing mechanism for the positive movement of both type levers and carriage, in both directions, the printer herein has an average type bar speed of only 40 milliseconds, the carriage can be returned (100 spaces) in 480 milliseconds, tabulation can be performed (50 spaces) in 296 milliseconds, the shifting operation consumes only 40 milliseconds and the back space operation can be performed in 15 milliseconds, with the result that the typing strokes for average copy are increased to 35 or more per second.

It is, therefore, the specific object of the invention to provide a printer of the power operated typewriter class in which the carriage is power driven in both directions of movement.

It is a further object of the invention to provide a novel carriage control mechanism, having means for mounting and operating a platen into upper and lowercase positions that is compatible with high speed type operation.

It is a further object of the invention to provide a high speed printer capable of automatic operation under control of a perforated control tape reader and which is capable of generating a signal designating the completion of a foregoing operation or function whereby a tape reader may be controlled to read a control tape and transmit the next following signal.

Further objects and advantages of the invention will become apparent as the specification is read in light of the drawings forming a part hereof, in which drawings like reference numerals indicate like parts, and in which:

Fig. 11 is a sectional view on line 11—11 of Fig. 1;

Fig. 12 is a sectional view on line 12—12 of Fig. 11;

Fig. 13 is a sectional view on line 13—13 of Fig. 12;

Figs. 14, 15 and 16 show the mechanism of Fig. 13 in various operational positions;

Fig. 17 is a fragmentary plan view of a type basket segment;

Fig. 18 is a sectional view on line 18—18 of Fig. 17;

Fig. 19 is a sectional view on line 19—19 of Fig. 17;

Fig. 20 is an end view of carriage mechanism;

Fig. 21 is a sectional view on line 21—21 of Fig. 20;

Figure 28:
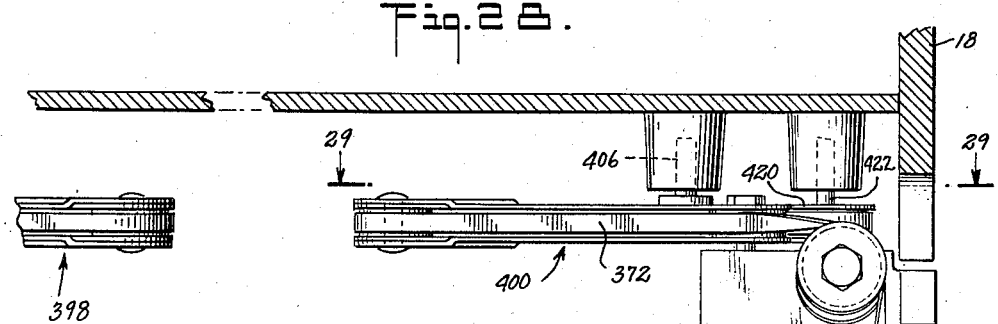
Figure 29:
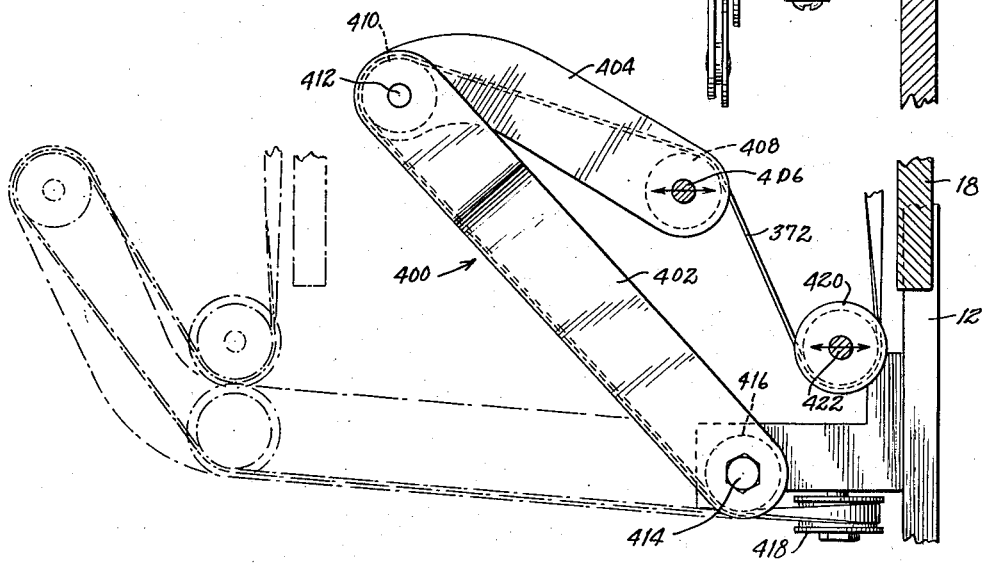
Figure 30:
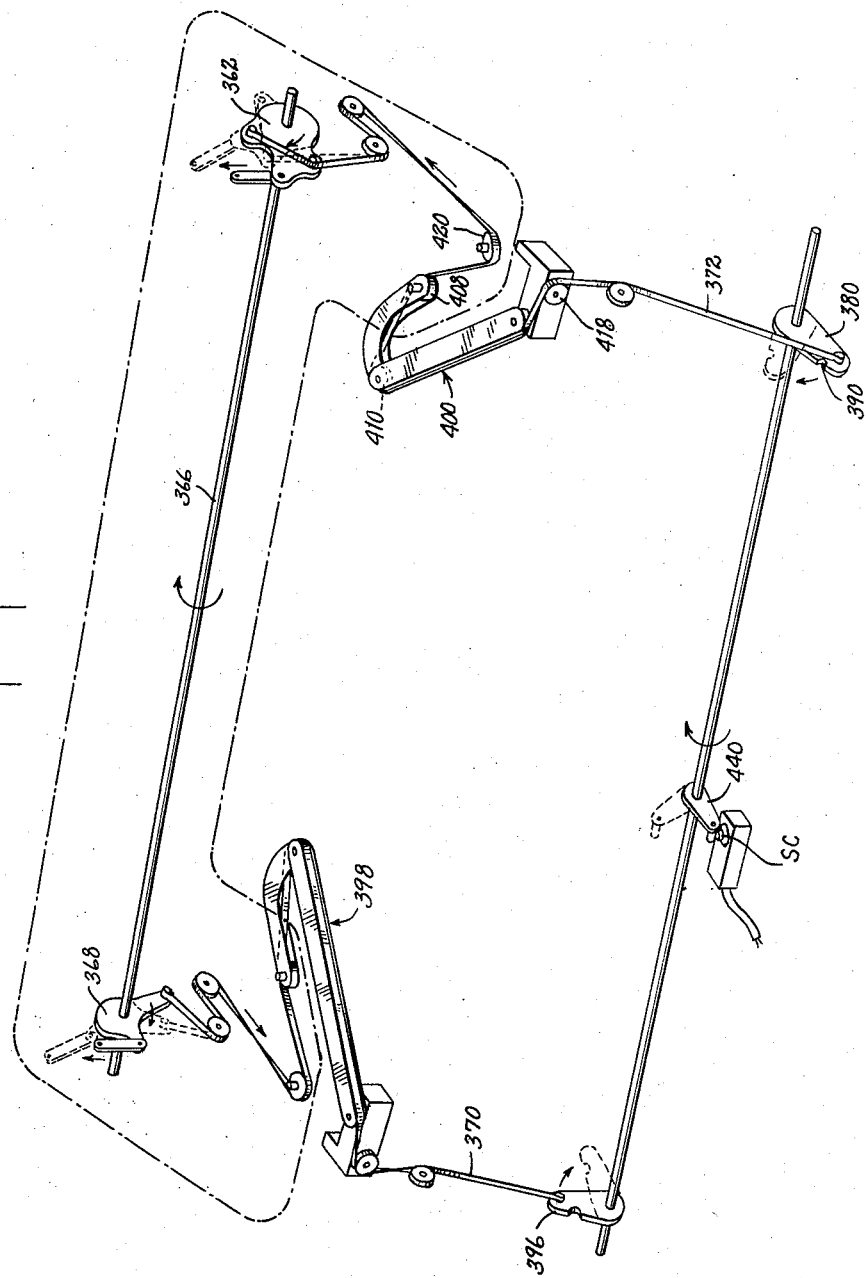
Figure 31:
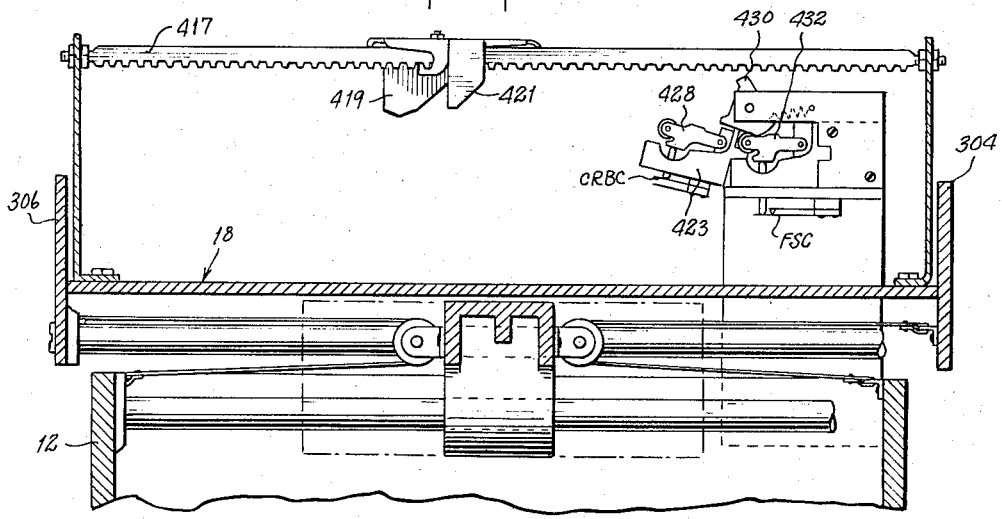
Figure 32:
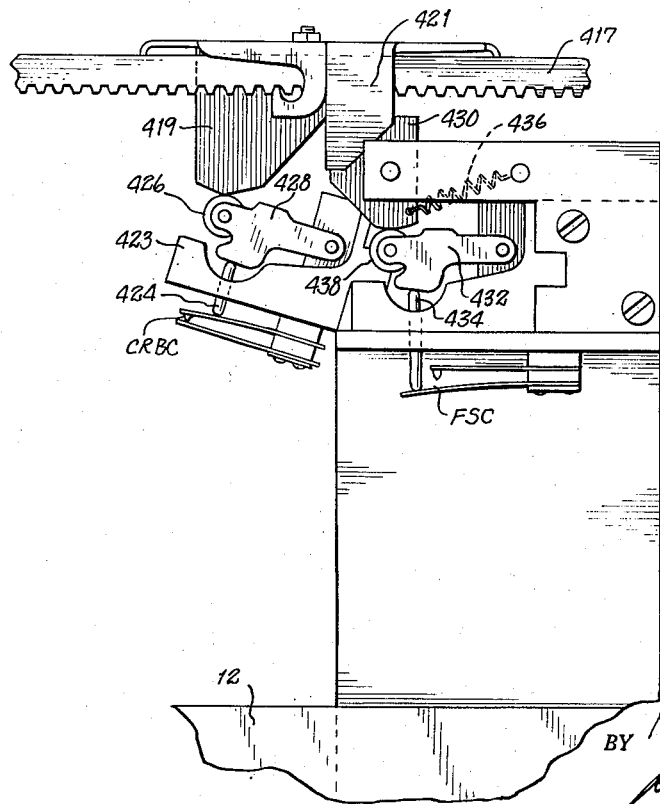
Figure 33:
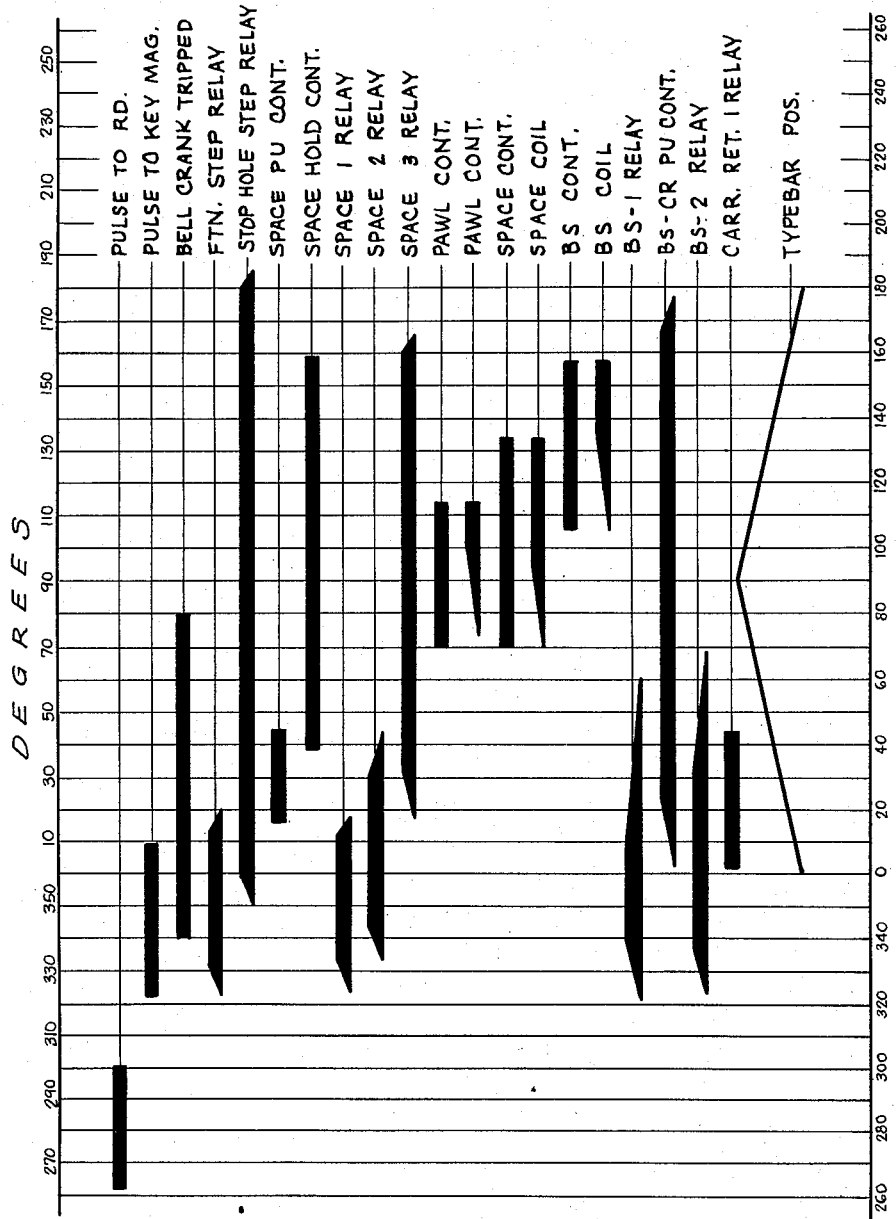

Figs. 22A and 22B, taken together, constitute a horizontal sectional view of carriage and platen control mechanism looking from the left toward the right side of the printer;

Fig. 23 is a view similar to that of Fig. 22A showing, however, the parts shifted for uppercase printing;

Fig. 24 is a view on line 24—24 of Fig. 23;

Fig. 25 is a view on line 25—25 of Fig. 23;

Fig. 26 is a view of certain platen shifting mechanism of Fig. 22B, shifted, however, into opposite position;

Fig. 27 is a sectional view on line 27—27 of Fig. 22B;

Fig. 28 is a vertical sectional view through one side of the printer base and carriage, illustrating carriage control mechanism;

Fig. 29 is a view along line 29—29 of Fig. 28;

Fig. 30 is a diagrammatic view of platen control mechanism;

Fig. 31 is a view on line 31—31 of Fig. 20;

Fig. 32 is an enlarged view of the contact mechanism shown in Fig. 31;

Fig. 33 is a timing diagram;

Figs. 34A through 34E, when assembled as shown in Fig. 35, comprise the electrical control system of the printer; and Fig. 35 is a diagram showing the relation of Figs. 34A through 34E.

Figure 4:
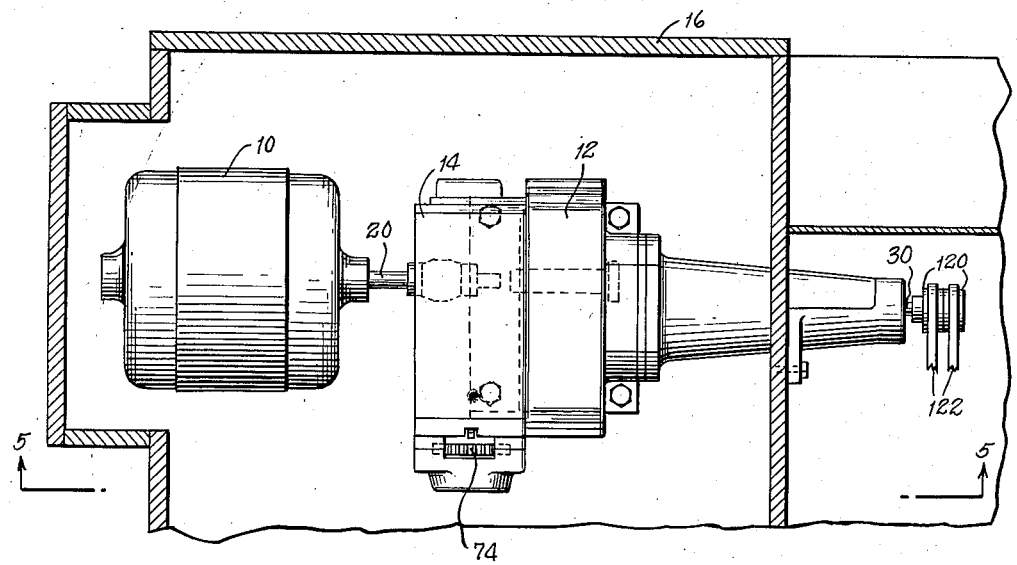
Fig. 4 is a horizontal section through the rear part of the frame and casing showing, in plan, certain of the drive mechanism.

The power for driving the printer is derived from a motor 10 and is transmitted through an escapement drive unit 12 and an electromagnetic clutch unit 14. The relationship of the motor, the escapement drive unit and the electromagnetic clutch unit may be seen in Figs. 4 and 5. The main frame 16 of the printer serves as a housing for these units and as a support for a movable carriage 18 as seen in Fig. 5.

Figure 6:
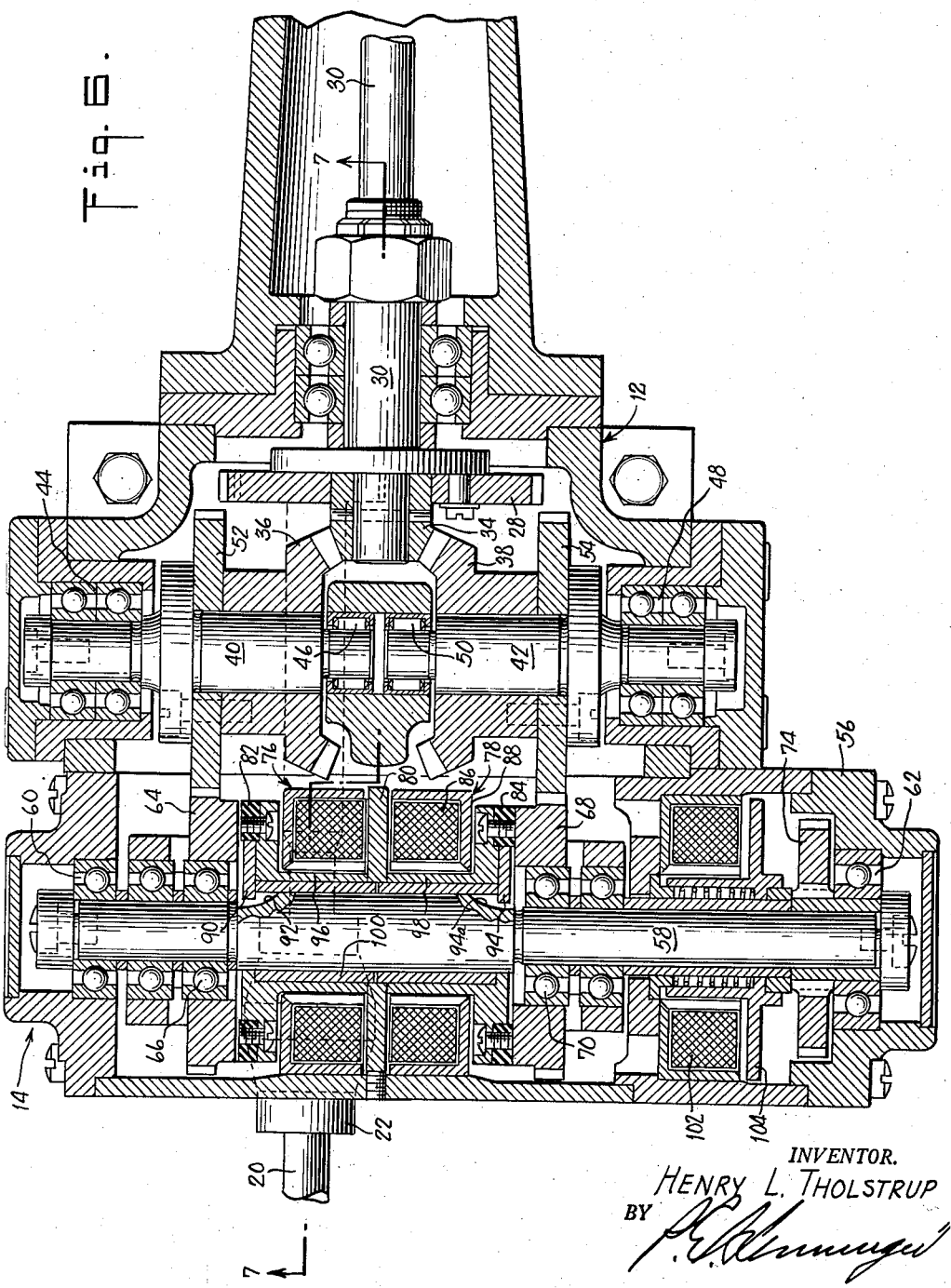
Fig. 6 is a horizontal sectional view taken on line 6—6 of Fig. 5 through the electromagnetic escapement clutch unit and escapement drive unit.
Figure 7:
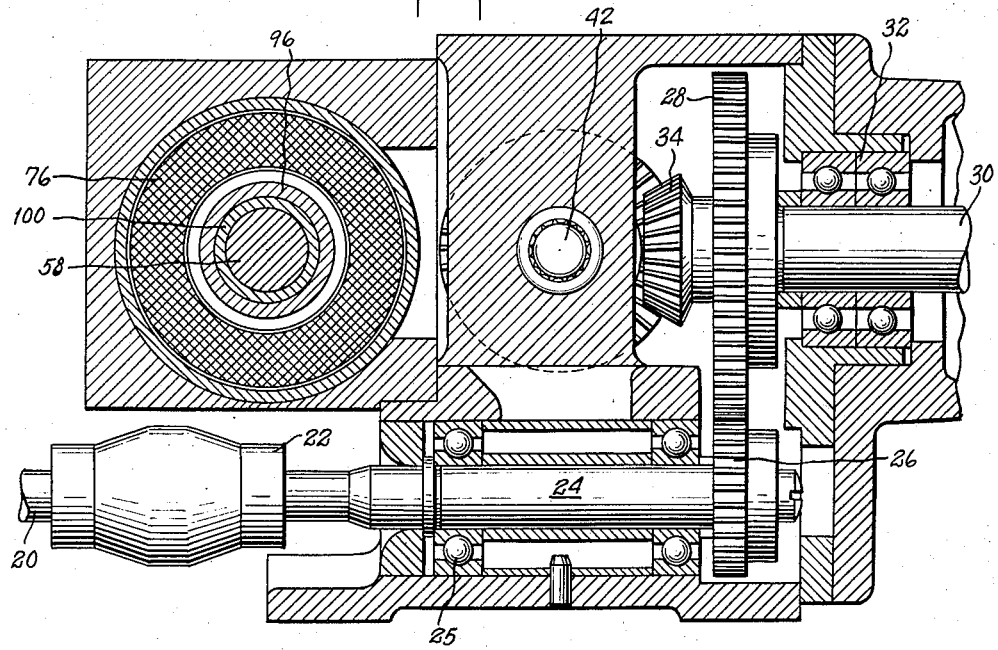
Fig. 7 is a sectional view on line 7—7 of Fig. 6.
Figure 8:
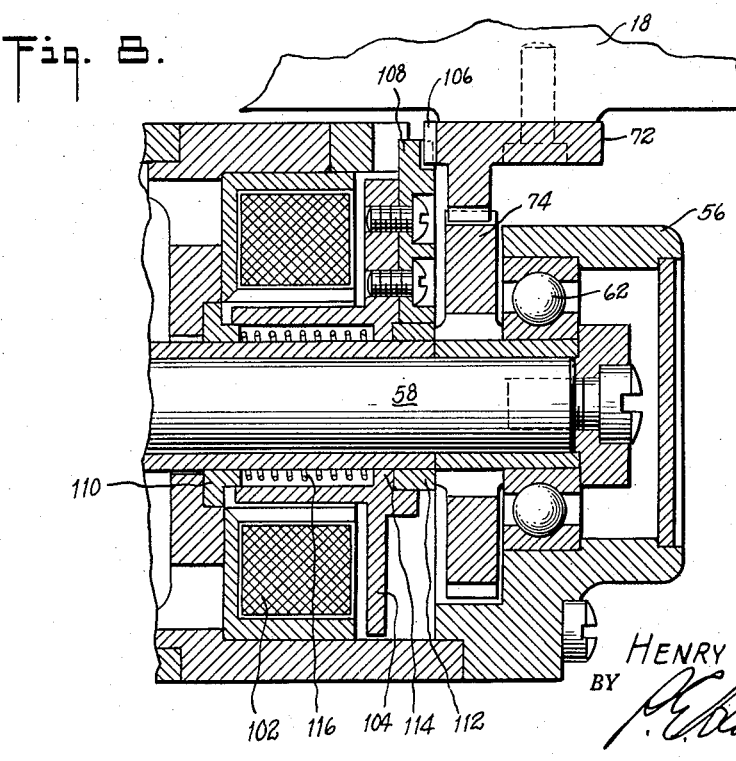
Fig. 8 is a horizontal sectional view on line 8—8 of Fig. 5 through a pawl clutch mechanism of the electromagnetic escapement clutch unit shown in relation to an associated escapement rack.

The escapement drive unit 12 and the electromagnetic clutch unit 14 are so constructed and arranged as to positively drive the carriage 18 in both forward and return directions. The details of the drive assembly are best shown in Figs. 6 through 8. The motor 10 is adapted to impart unidirectional rotation to a motor shaft 20 which is connected by means of a flexible coupling 22 to a drive shaft 24 (Fig. 7). The drive shaft 24 is mounted for rotation in suitable antifriction bearings 25, and has fixed to its distal end a drive shaft pinion 26. The drive shaft pinion 26 meshes with an intermediate gear 28, which is fixed to the inner end of a pulley shaft 30 which is suitably journalled for rotation in antifriction bearings 32. The inner end of the pulley shaft 30 has fixed thereto a bevelled pinion 34 which meshes with a pair of bevelled gears 36 and 38. The bevelled gears 36 and 38 are fixed respectively to driven shafts 40 and 42. The driven shaft 40 is mounted for rotation at opposite ends thereon in suitable antifriction bearings 44 and 46, respectively, while the driven shaft 42 is likewise mounted in similar antifriction bearings 48 and 50. It will be seen, therefore, that while the pulley shaft 30 is being driven in one direction, the driven shafts 40 and 42 are simultaneously drivin in opposite directions.

The driven shaft 40 has fixed thereto a gear 52 while the driven shaft 42 has fixed thereto a gear 54. The gears 52 and 54 are in constant mesh with related drive gears in the electromagnetic escapement clutch unit 14, which is also shown in detail in Fig. 6 of the drawings. The electromagnetic escapement clutch unit is housed in a casing 56 which provides bearings for an escapement shaft 58. Thus, the escapement shaft 58 is supported for rotation in the casing 56 by means of suitable antifriction bearings 60 and 62 located at the opposite ends of the escapement shaft 58. The escapement shaft 58 constitutes a bearing for a pair of drive gears 64 and 68 which, as stated heretofore, are in contact respectively with the gears 52 and 54 of the escapement drive unit 12. Thus, the drive gear 64 is mounted on the escapement shaft 58 for free rotation thereon by means of suitable antifriction bearings 66. The drive gear 64 is in constant mesh with the gears 52. By the same token, the second drive gear 68 is mounted for rotation on the escapement shaft 58 by means of suitable antifriction bearings 70. The drive gear 68 is that which is in constant mesh with the gear 54. It can be seen, therefore, that so long as power is being applied to the drive shaft 24, the drive gear 64 of the electromagnetic escapement clutch unit will be driven in one direction and the drive gear 68 of the electromagnetic escapement clutch unit will be driven in the opposite direction. This provides an avaliable driving force for driving the movable carriage 18 either forward or backward, depending on which of the drive gears 64 or 68 is effectively coupled, through intermediate gearing, to an escapement rack which is fixed to the carriage 18.

Figure 5:
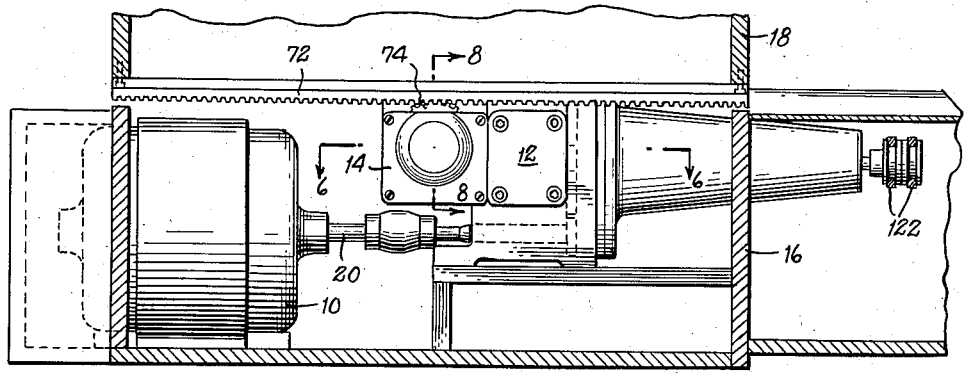
Fig. 5 is a view on line 5—5 of Fig. 4, showing the drive mechanism in end elevation.

By reference to Fig. 5, it will be seen that the carriage 18 has fixed thereto an escapement rack 72. The downwardly projecting teeth of the escapement rack 72 mesh with an escapement pinion 74. By reference to Fig. 6 of the drawings, it will be seen that the escapement pinion 74 is keyed to the escapement shaft 58 and, therefore, partakes the rotation of the escapement shaft in whichever direction it is driven.

The electromagnetic escapement clutch unit derives its name from the fact that it includes an electromagnetic clutch organization by means of which either the drive gear 64 or the drive gear 68 may be coupled selectively to the escapement shaft 58 for driving that shaft in either a clockwise or counterclockwise direction; thus, imparting a selected direction of rotation to the escapement pinion 74 for either driving of the carriage 18 either forward or backward.

By reference once again to Fig. 6 of the drawings, it may be seen that the electromagnetic clutch organization comprises a pair of annular electromagnets 76 and 78 which cooperate with a common armature 80. The electromagnets 76 and 78 are adapted to control respectively associated clutch discs 82 and 84.

The electromagnets 76 and 78 are identical in structure and by reference to Fig. 6 it can be seen that they consist of a coil 86 and an associated coil shell 88. The magnets are mounted in a fixed position in the casing 56 of the electromagnetic escapement clutch unit.

The clutch disc 82 is adapted to engage a confronting face of the drive gear 64 and the clutch disc 84 is adapted to engage a confronting face of the drive gear 68. The respective confronting faces are normally spaced from each other to permit free rotation of the drive gears 64 and 68 on the escapement shaft 58. The clutch discs 82 and 84 are the instruments by which the escapement shaft 58 is rotated. Such rotation is by reason of a sliding spline connection between the clutch discs 82 and 84 and the escapement shaft 58. By reference to Fig. 6, it will be seen that the clutch disc 82 has an inwardly projecting lug 90 which is located in an elongated slot 92 formed in an axial direction in the escapement shaft 58. In like manner, the clutch disc 84 has an inwardly projecting lug 94 which extends into an axially disposed slot 94a formed in the face of the escapement shaft 58. As a consequence of the relationship just described, the clutch disc 82, when held in driving contact with the drive gear 64, will effectively couple the gear 64 to the escapement shaft 58 to drive the escapement shaft in one direction, while the clutch disc 84, when held in engagement with the drive gear 68, will effectively couple the drive gear 68 to the escapement shaft 58 to drive the escapement shaft in the opposite direction. For purpose of identification, the coil 76 may be regarded as the space or forward drive clutch coil, and the coil 78 may be designated the back space or backward drive clutch coil.

The armature 80 constitutes the element for selectively engaging the clutch discs 82 and 84 to their associated drive gear. In this connection, it will be noted that the clutch disc 82 is carried by a hub 96 while the clutch disc 84 is carried by a hub 98. The inner ends of the hubs 96 and 98 are separated by the armature 80.

Since the armature 80 engages the inner ends of the clutch hubs 96 and 98, the armature can move the hub 96 or 98 outwardly and consequently engage the clutch discs associated therewith with their respective drive gears depending on which of the electromagnet coils 76 or 78 is energized. If the coil of the electromagnet 76 is energized, it will tend to attract the armature 80 and this in turn will move the hub 96 outwardly on the bearing sleeve 100, thereby engaging the clutch disc 82 with the drive gear 64. The drive gear 64 is now effectively coupled with the escapement shaft 58 and will thus drive the escapement shaft in a forward direction. If, however, the coil of the electromagnet 78 is energized, it will tend to attract the armature 80 and thereby impart such axial movement to the hub 98 as to engage the clutch disc 84 with its associated drive gear 68 and thereby effectively couple the drive gear 68 to the escapement shaft 58, so that the escapement shaft is driven in the opposite direction.

The electromagnetic escapement clutch unit also includes a pawl clutch coil 102 which is associated with a pawl hub 104 comprising the armature for the pawl clutch coil 102. For a consideration of the structure and function of the pawl clutch coil, reference should be had to both Figs. 6 and 8. In Fig. 8, it will be seen that the escapement rack has not only the downwardly projecting teeth which engage the escapement pinion 74, but also rearwardly extending teeth 106 which are normally engaged by a space pawl 108 carried by the pawl hub 104.

So long as the space pawl 108 engages the teeth 106 of the escapement rack, the carriage 18 will be locked against movemvent in either direction, this being the normal condition.

The pawl hub 104 is mounted for limited axial movement along the escapement shaft 58 by means of a pair of bearing rings 110 and 112. The outward movement of the pawl hub 104 is limited by an inwardly extending flange 114 which is adapted to engage the bearing ring 112 when the hub pawl 104 is at its outer limit of movement. Disposed between the flange 114 and the edge of the bearing ring 110 is a coil spring 116 which serves to hold the pawl hub 104 in its escapement rack engaging position, i.e., the pawl hub 104 is urged outwardly so that the pawl 108 carried thereby is in engagement with the teeth 106 of the escapement rack 72. Since the escapement rack, and consequently the carriage, is normally locked by the pawl 108, it is evident that to permit movement of the carriage it is necessary to energize the pawl clutch coil 102. When the pawl clutch coil 102 is energized, the pawl hub 104, which comprises the armature, will be drawn toward the pawl coil 102 and against the force of the spring 116 to an extent which will disengage the pawl 108 from the teeth 106 thereby freeing the escapement rack, and consequently the carriage, for movement in either direction.

Figure 9:
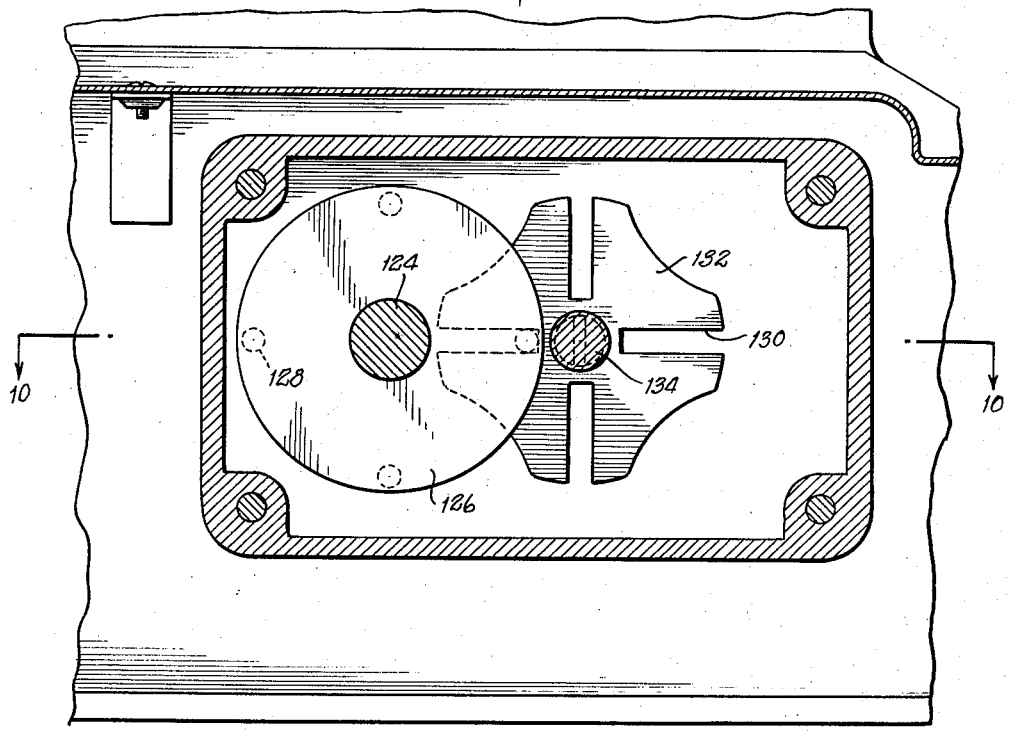
Fig. 9 is a sectional view on line 9—9 of Fig. 1, illustrating a Geneva drive mechanism.
Figure 10:
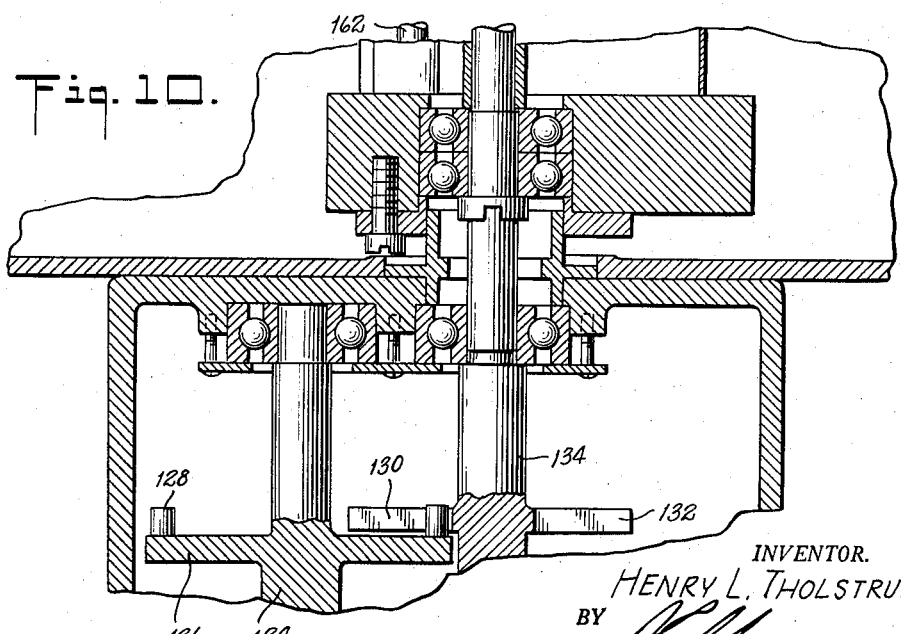
Fig. 10 is a sectional view on line 10—10 of Fig. 9.

The mechanism thus far described is sufficient for controlling the movement of the carriage 18 in either forward or backward directions. It remains to be seen how power is applied to the type action of the printer. By reference to Fig. 4, it will be seen that the pulley shaft 30 extends transversely beyond the side of the printer frame 16 where it has fixed thereto a pair of V-drive pulleys 120. These pulleys accommodate a pair of drive belts 122 for driving a shaft 124 through which power is transmitted to a Geneva drive which is illustrated in some detail in Figs. 9 and 10. The shaft 124 has fixed thereto a Geneva pin plate 126 which has four pins 128 extending from the inner face thereof. The pins 128 are adapted to engage respective slots 130 in a Geneva disc 132. The Geneva disc is fixed to a power shaft 134, the power shaft 134 extending transversely of the printer frame in the area of the type action mechanism. Figs. 11 and 12 show the position of the power shaft 134.

It has been stated heretofore that one of the objectives of the invention is the positive drive of the type levers at all times, i.e., each type lever is not only positively driven into printing engagement, but it is positively driven to its normal inactive position in the type basket. To obtain an understanding of the mechanisms resulting in this function, reference should be had to Figs. 11 through 16.

A complement of type levers 136 is mounted in a type basket 138 such that each type lever can be rotated into and out of a common printing position with respect to a platen 141 mounted on the carriage 18. The speed at which the type levers are adapted to operate precludes the conventional use of a segment wire for mounting the type levers in the type basket. Consequently, this invention contemplates an improved means for mounting the individual type levers in the type basket such that the operational strain of the positive drive can be successfully absorbed.

Figs. 17 through 19 show type lever and type basket structures adapted to this end. Each of the type levers 136, as best seen in Fig. 19, has a pivot point in the type basket 138 consisting of a small ball 140 which is swaged into a eye at the inner end of the type lever. The type basket is segmental in form as in the usual typewriter structure and consists of a base segment 142 and a locking segment 144. Each of the segments 142 and 144 has complementary hemispherical concavities forming a bearing pocket 146 for the type lever bearing balls 140. The bearing balls 140 of a complement of type levers are seated in the concavities of the base segment 142 and are there held in place by the locking segment 144 which is fixed to the base segment 142 by means of a series of screws 148.

In a machine adapted to high speed operation, such as the present machine, it is important that each of the type levers be retained in the type basket under substantially the same amount of pressure. In order to accomplish this particular result, the locking segment 144 and particularly that part which engages the pivot balls 140 assumes the form of a rim 150 which has a slot 152 milled therein thereby imparting a degree of resilience to the rim 150 under which the type lever pivot balls 140 are engaged.

By reference to Fig. 11, it can be seen that each of the type levers 136 has formed at the pivot end thereof a gear segment 154. Each type lever gear segment 154 is constantly in engagement with mating teeth 156 of a related bell crank 158. It may be seen, therefore, that whenever the bell crank 158 of Fig. 11 is rotated in a counterclockwise direction, the type lever 136 which is associated therewith, will be rocked in a clockwise direction which is the printing stroke. When the bell crank 158 is rocked in a clockwise direction, the type lever associated therewith will be rocked in a counterclockwise direction thereby returning the type lever to its normal inoperative position of rest against a type lever stop 160. The mechanism by which the bell cranks 158 are operated and controlled will now be described. In this connection, it is to be understood that each type lever of the entire complement of type levers is operated by a bell crank assembly such as that shown in Fig. 11.

The bell crank 158 is mounted for rocking movement on a bell crank shaft 162 and associated with which bell crank is a drive plate 164 fixed for rotation with the power shaft 134. Extending from one face of the drive plate 164 are a pair of drive pins 166 and 168. These drive pins are adapted to cooperate with elements of the bell crank 158 to drive the bell crank in the manner heretofore described. The bell crank assembly is best understood by reference to Fig. 13 in which it is seen that the bell crank 158 carries a bell crank latch 170, a guide plate 172, a stop pawl 174 and a pair of lugs 176 and 178. The bell crank latch 170 is pivoted on the bell crank 158 by means of a pivot pin 180. The bell crank latch 170 is biased about the pivot pin 180 in a counterclockwise direction by means of a spring 182 which extends between the free end of the bell crank latch 170 and the bell crank 158. The bell crank latch 170 is normally held in retracted position, as shown in Figs. 11 and 13, by a bell crank trip lever 184. The bell crank trip lever 184 is pivoted on a trip lever shaft 186 about which it is normally biased in a counterclockwise direction by a spring 188 connecting the upper end of the bell crank trip lever 184 with a casing 190 in which the bell crank assembly is located. The bell crank trip lever is generally L-shaped and has an inwardly extending leg 192, which at its free end has a downwardly extending finger 194 adapted to engage a latch point 196 at the lower end of the bell crank latch 170. While the finger 194 and the latch point 196 are engaged as shown in Figs. 11 and 13, the bell crank latch 170 will be in its retracted position against the tension of the spring 182.

It has been stated heretofore that the power shaft 134 is rotating constantly with the result that the drive plates 164 also rotate constantly. So long as the bell crank latch 170 is in its retracted position, the pins 166 and 168 of the associated drive plate 164 will rotate freely in respect to the bell crank 158. In this connection, it should be noted that the pins 166 and 168 extend into proximity with the face of the bell crank 158 such that if the bell crank latch 170 is released, its lower free end 200 of the bell crank latch will be engaged by either of these pins with the result that the bell crank 158 will be driven in a counterclockwise direction about the bell crank shaft 162.

In order to control the operation of the bell cranks there has been provided a key magnet 202, one for each bell crank, arranged in two staggered rows across the front of the printer. Each key magnet has a trip pin 204 in contact with an armature 206. Thus, for example, if the magnet 202 of Fig. 11 is energized, it will attract its armature 206 and thereby move the associated trip pin 204 rearwardly. The armatures 206 are normally held away from their related magnets by means of a spring 208. The trip pin 204 of Fig. 11, for example, when operated by reason of energization of its related key magnet, will rock the bell crank trip lever 184 in a clockwise direction about the trip lever shaft 186. This will serve to release the bell crank latch 170 so that its spring 182 will rotate the latch 170 in a counterclockwise direction about its pivot 180 and thereby project the free end 200 of the bell crank latch 170 into the path of the drive pin 166, for example, thereby conditioning the bell crank 158 for operation. The tension of the spring 188 which is connected to the bell crank trip lever 184 is sufficient to return the trip pin 204 to its normal inoperative position when its related armature 206 is released by the key magnet 202.

It is now possible to follow an operative cycle of a bell crank assembly and for this purpose further reference should be made to Figs. 14, 15 and 16.

As previously stated, the normal inoperative or rest position of the bell crank is that shown in Fig. 13, wherein the bell crank trip lever 184 engages the latch point 196 of the bell crank latch 170. It has also been previously stated that the trip pin 204, when projected rearwardly by its associated key magnet armature 206 will rock the bell crank trip lever 184 and release the bell crank latch 170. This is the condition of the parts illustrated in Fig. 14. It will be noted that the free end 200 of the bell crank latch 170 in Fig. 14 is now in the orbit of the drive pin 166. As the drive pin 166 is rotated in a clockwise direction, its contact with the free end 200 of the bell crank latch 170 will result in a counterclockwise movement of the bell crank 158 about the bell crank shaft 162. This movement will continue until the slot formed between lug 176 on the face of the bell crank and the adjacent end of the guide plate 172 coincides with the path of the drive pin 166. At this moment, the drive pin 166 will enter the slot, as shown in Fig. 15. At the moment the drive pin 166 is at the inner end of the slot, the bell crank 158 will have been rotated about the bell crank shaft 162 to an extent such that the type lever 136 is driven against the platen and a typing impression results. As the pin 166 continues in its orbit of movement, it will enter the slot formed between the lug 178 on the face of the segment 158 and the adjacent end of the guide plate 172. At this moment, the lug 178 is engaged by the drive pin 166 with the result that the segment 158 is now rocked in a clockwise direction about the bell crank shaft 162. This results in the counterclockwise movement of the type lever 136 such that by the time the bell crank 158 has been driven to the extent of its movement by the drive pin 166, the bell crank 158 will have been returned to the position substantially as shown in Fig. 13 and the type lever 136 will have been restored to its position against the type lever stop 160, as shown in Fig. 11.

It will be noted that the drive pin 168 has played no part in the operation of the bell crank in the cycle above described. However, since the power shaft 134 has been rotated substantially 180°, the drive pin 168 is now in position to pick up the bell crank as heretofore described. In other words, the drive pin 168 now occupies the same relative position occupied by the drive pin 166 of Fig. 13. If the bell crank latch is again in the orbit of the drive pins, the drive pin 168 will serve to drive the bell crank through the next cycle of operation. It is evident, therefore, that the bell crank and consequently the type lever can be operated twice during each revolution of the power shaft thereby greatly increasing the printing speed presently inherent in similar printers which operate a type lever only once during each complete revolution of the power shaft.

After each operative typing cycle, the bell crank 158 is relatched in its normal position of rest. This latching operation follows from the fact that the bell crank latch 170 and particularly the upper end thereof is brought into contact with a stop 208 which effectively rocks the bell crank latch in a clockwise direction about its pivot 180 thereby depressing the latch point 196, so that it will be engaged by the finger 194 of the bell crank trip lever 184. The elements involved in the relatching operation are conditioned for the relatching of the bell crank latch at the time the bell crank is rocked to its limit position during the typing stroke, i.e., the position corresponding generally to that shown in Fig. 15.

It can now be seen that any one of a complement of type levers can be selected for operation during any half revolution of the power shaft 134 by releasing its associated bell crank assembly for operation. Since each bell crank assembly has its individual bell crank trip lever and trip pin, the type levers may be sequentially caused to operate by selectively energizing the key magnets in the desired sequence and thereby operate a selected trip pin for controlling its related bell crank assembly.

The key magnets, one for each trip pin, are arranged in a frame along the front of the printer. These magnets, as seen in Fig. 11, are arranged in an upper and lower row, so that they can be somewhat staggered in relation to each other. Accordingly, the magnets in the upper row, as seen in Fig. 11, attract the armatures 206, whereas the magnets in the lower row attract armatures which are oppositely disposed. By way of example, it can be seen in Fig. 11, that the magnet 202a of the lower row of magnets has associated therewith an armature 206a, which is pivoted on the magnet frame and biased into its released position by means of the spring 208a. A common retaining bar 204a extends across the magnet assembly and serves to limit the movement of the armatures in the outward direction. The key magnets are conventionally under control of a punched paper tape reader and code translating system, such as that shown in my Patent No. 2,461,451, issued February 8, 1949. In tape reading systems of this general category, a plurality of transversely arranged character representing holes are sensed and the combinational code so sensed is translated to produce a single impulse representative of a character. These impulses are conducted to the key magnets of the present invention by means of suitable electrical conductors connected to the individual key magnets corresponding to the characters represented by the several impulses.

The positive drive arrangement for the type levers requires that the type basket be fixed in relation to the bell crank assemblies. Therefore, resort must be had to a system for printing upper and lowercase characters which is compatible with a fixed type basket. In printers of the conventional typewriter category, the type basket is disposed in an upper position for the typing of lowercase characters and is depressed to a lower position for the printing of uppercase characters. This arrangement, however, is not suitable in the present machine and mechanism has, therefore, been provided whereby the platen may be shifted upwardly for the typing of uppercase characters and returned to a lower position for the typing of lowercase characters. The mechanism for accomplishing these operations is illustrated in Figs. 20 through 30, inclusive, and reference thereto will now be had in connection with the description that is to follow.

The carriage 18 constitutes the vehicle for the platen 140 and a paper roll holder 300. The carriage consists essentially of a base plate 302 having a pair of upstanding end walls 304 and 306. Fixed in the end walls 304 and 306 and located under the base plate 302 of the carriage are a pair of parallel guide rods 308 and 310. An identical pair of guide rods 312 and 314 are fixed in the side walls of the printer frame 16. The guide rods 308—314 cooperate with a floating carriage truck 316. The carriage truck 316 has a pair of elongated bearing sleeves 318 adapted to receive and slide on the bearing rods 308 and 312, respectively, and a pair of shorter bearing sleeves 320, which are adapted to receive and slide on the bearing rods 310 and 314, respectively.

It will be seen, therefore, that the carriage truck 316 constitutes the connection between the carriage 18 and the base frame 16 of the printer. As shown in Fig. 20, the escapement rack 72 is fixed to the bottom of the carriage frame and thereby controls the movement of the carriage transverse of the printer frame 16. The carriage truck 316 is controlled by a pair of stabilizing tapes 322 and 324 which are effective to limit the transverse movement of the carriage truck 316 to one-half the distance traversed by the carriage 18. The stabilizing tape 322 is trained about a pulley 326 attached to and extending laterally from one face of the carriage truck 316, one end of the tape 322 being attached to an anchor 328, fixed to the inner face of the printer frame 16 at one side thereof, and the other end of the tape being fixed to the same side of the printer by an anchor 330 at the inner face of the end plate 304. In like manner, the tape 324 is trained about a pulley 332 fixed to and extending from the opposite face of the carriage truck 316, while its respective ends are also anchored to the opposite wall of the typewriter frame 16 by means of an anchor 334 and to the inner face of the end plate 306 by means of an anchor 336. From the foregoing description, it will be seen that as the carriage is reciprocated in respect to the printer frame, the carriage truck 316 will slide in the same direction on the guide rails 308—314, but only for half the distance through which the carriage moves.

The platen 141 is supported for rotation in a pair of identical platen supported plates disposed respectively adjacent the end walls 304 and 306 of the carriage on which end walls the respective plates are mounted for oblique movement in an up-and-down path, whereby the platen can be shifted between upper and lowercase printing positions. Since the platen support plates are identical, their form and mounting may be observed by reference to Figs. 22A and 23 wherein is illustrated the platen support plate 338 which is associated with the carriage end wall 306 at the right of the printer. The platen support plates are mounted by means of reciprocating guide structures, one of which is shown in Fig. 25. In Fig. 23, for example, the platen support plate 338 has attached thereto a pair of brackets 342 and 344 in each of which is fixed a depending guide pin as, for example, the guide pin 346 associated with the bracket 344. These guide pins are adapted to slide in guide bearings 348 and 350 which are mounted in the end wall 306 of the carriage. By means of a pair of such guide structures associated with each of the platen support plates, these plates are mounted for movement such that the platen 140 can be raised for the typing of uppercase characters, such as shown in Fig. 23 or lowered for the printing of lowercase characters, such as shown in Fig. 22A.

The platen supporting plates are operated into their respective upper and lower positions by means of a linkage system, of which that associated with the platen supporting plate 338, is shown in Figs. 22A and 23. Journalled in the side plate of the carriage 306, for example, is a lever 352 which is capable of rocking about a mounting pin 354. The lever 352 and the platen supporting plate 338 are operatively connected with each other by means of a linkage 356 which has one end thereof pivoted to the platen supporting plate 338 by means of a stud 358 while the other end thereof is pivoted to the lever 352 by means of a pin 360, which is located slightly above and in front of the pivot 354 about which the lever 352 moves. This constitutes the lever 352 and the link 356, an eccentric device which is adapted to exert an operating force on the platen support plate 338 which is in the direction of the guide pins 346.

The lever 352 is connected to an actuating plate 362 by means of a link 364. The actuating plate 362 is keyed to an upper shift-shaft 366 which extends between the end plates of the carriage and is journalled therein for rocking movement. By reference to Fig. 22A, it will be seen that when the shaft 366 is rotated in a clockwise direction, the actuating plate 362 will pull the link 364 in a downward direction, thereby rocking the lever 352 a counterclockwise direction. This effectively elevates the platen supporting plate 338 to the position illustrated in Fig. 23 where the platen 140 is positioned for uppercase printing. This is the position of the parts illustrated in Fig. 30 which is a diagrammatic presentation of the mechanism involved for shifting the platen from one position to another.

By reference to Fig. 30, it will be seen that the opposite end of the upper shift-shaft 366 has also keyed thereto an operating plate 368 which serves the same function as the operating plate 362 but which has a configuration somewhat different by reason of the fact that while the plate 362 moves in one direction, the plate 368 must produce a motion which is effective in the opposite direction.

The operating plates 362 and 368, and consequently the upper shift-shaft 366, are alternately moved from one position to another by means of a shift tape system 370 and 372 interconnecting the operating plates 368 and 362, respectively, with an intermediate shift-shaft 374 located in the base of the printer. The intermediate shift-shaft 374 extends transversely of the printer base and has its ends journalled in the side walls of the base, so that the shaft may be rocked from one position to another by mechanism shown in Figs. 22B, 26 and 27. In these figures, the intermediate shift-shaft 374 carries at each end generally similar mechanism for imparting rocking motion to the shaft. The mechanism shown in the figures referred to is that located at the right side of the printer which may be considered the mechanism for shifting the platen to its lowercase position. As stated, the mechanism at the left end of the intermediate shift-shaft 374 is generally similar and such differences as exist will be pointed out in reference to the diagrammatic view of Fig. 30; it being pointed out here that the mechanism at the left side of the printer is that which controls the rocking of the shaft 374 for shifting the platen mechanism into its uppercase printing position.

The bell crank shaft 162 has mounted thereon at opposite ends thereof platen shift bell cranks which are identical and of which the lowercase shift bell crank 376 of Fig. 22B is typical. These ball cranks are the same in form and operation as the bell cranks associated with the type levers heretofore described, with the exception that they have no gear segment since they are designed to transmit operating power to the shift mechanism by means of an interconnecting link, such as the link 378 associated with the lowercase bell crank 376 in Fig. 22B. The shift bell cranks can be operated from the power shaft 134, as heretofore described in respect to the bell crank units associated with the type levers, and such operation is under control of shift magnets, in all respects the same as the key magnets heretofore described.

When the shift segment 376 is operated in a clockwise direction as seen in Fig. 22B, the link 378 will transmit power to a link 380 which is mounted for free rotation on the intermediate shift-shaft 374. Associated with the link 380 is a mechanism which is keyed to the intermediate shift-shaft 374 and which is adapted to rotate the intermediate shift-shaft 374 when operated by the link 380. This mechanism is, in effect, a sleeve 382 which is keyed to the intermediate shift-shaft 374 by means of a pin 384. The sleeve 382 has a pair of flanges projecting therefrom. A flange 386 is located in proximity to the link 380 and has a stud 388 projecting inwardly from the face thereof. The stud 388 lies in the vertical plane of the link 380 and is adapted to register with a notch 390 which is formed in the upper edge of the link 380. When the shift mechanism is in the uppercase position, the disposition of the elements just referred to are as shown in Fig. 26, wherein the stud 388 rests in the notch 390 so that when the link 378 is pulled forward by operation of the shift segment 376, the sleeve 382 and consequently the intermediate shift-shaft 374 will be rocked in a counterclockwise direction which is effective to lower the platen supporting mechanism into lowercase printing position.

When the intermediate shift-shaft 374 has been rocked to its clockwise position, as shown in Fig. 26, the shift tape 372 which is attached to a pin 392, carried by a flange 394 at the opposite end of the sleeve 382, will be pulled down with the result that the plate 362 of Fig. 22A will be rotated in a clockwise direction, thus rotating the shift-shaft 366 in a clockwise direction to effect elevation of the platen support plates into uppercase printing position. When the shift segment 376 is operated, the link 378 will be pulled forwardly with the result that the link 380 will engage the stud 388 thereby rocking the intermediate shift-shaft 374 in a counterclockwise direction, such as shown in Fig. 22B. This, in effect, relieves the tension on the shift tape 372 and applies tension to the shift tape 370, as seen in Fig. 30. Tension on the shift tape 370 will rotate the plate 368 and consequently the upper shift-shaft 366 in a clockwise direction. The result of this is that the platen support plates are lowered into lowercase printing position.

The shift segment and associated mechanism for operating the intermediate shift-shaft 374 in a clockwise direction is in all respects the same as that described in connection with the lowercase shift mechanism with the exception that the link 396 of Fig. 30, which is the counterpart of the link 380 of Figs. 22B, 26 and 27, is oppositely mounted on the intermediate shift-shaft 374 and the link, corresponding to the link 378, connecting it to the uppercase shift segment is extended to the front of the intermediate shift-shaft 374 such that the link 396 is pulled about the intermediate shift-shaft 374 in a clockwise direction.

The fact that the shift tapes 370 and 372 each has an end thereof connected to a point in the base of the printer which is fixed in the horizontal direction and the other ends thereof connected to points in the carriage, which is movable in a horizontal direction, demands mechanism for keeping these tapes under constant tension at all times. The mechanism for the stated purpose is shown in the diagram illustration of Fig. 30 and the detailed nature thereof is more particularly illustrated in Figs. 28 and 29. In Fig. 30, it will be seen that the tension of the tape 370 is controlled by a pentagraph lever 398 while the tension of the tape 372 is controlled by an identical lever 400. As the carriage moves from right to left, for example, tension on the tape 372 tends to increase while tension on the tape 370 tends to decrease. Compensation of this condition is provided by the relative shortening of the pentagraph lever 400 and the relative elongation of the pentagraph lever 398. A consideration of these functions will become clear by reference to Fig. 29 which shows the details of the lever 400.

The lever 400, which is typical of both such levers employed, comprises a long arm 402, which is pivoted on the base 12 of the printer and a short curved arm 404, which is pivoted to the free end of the long arm 402. The end of the short arm 404, which is distant from its connection to the long arm 402, is pivoted to the underside of the carriage 18 by means of a pivot pin 406. The pivot pin 406 also supports a guide pulley 408 directly under the adjacent end of the short arm 404. There is also a guide pulley 410 on a pin 412 which connects the arms 402 and 404. A pin 414 by means of which the arm 402 is mounted on the base 12 also supports a guide pulley 416. The shift tape 372 is trained upwardly from the pin 392 (Fig. 27) about a series of guide pulleys including the pulleys 418, 416, 410 and 408. This shift tape also passes about a guide pulley 420 mounted on a pin 422 extending downwardly from the lower face of the carriage 18. Beyond this point, the shift tape 372 is connected to the operating plate 362 as shown in Fig. 30.

The full line position of the parts shown in Fig. 29 is that which prevails when the carriage is in its so-called home position, i.e., when it is in registration with the base. In order to initiate a typing operation, the carriage will first be shifted to the right and as the printing of a line proceeds, the parts move progressively and will assume the dotted line position of Fig. 29 by the time the carriage approaches its left hand position. A study of Fig. 29 will indicate that as the arms 402 and 404 rotate about their respective pivot points 414 and 406 into the dotted line position, the short arm 404 will assume an extended position in respect to the long arm 402 and thereby maintain shift tape tension to compensate for change of carriage position.

The carriage 18 also supports a margin rack, as shown in Fig. 31. Slidably mounted on the rack are a pair of switch actuators 419 and 421 which are adapted to control the position of a carriage return break contact CRBC and a carriage return final stop contact FSC, respectively. The carriage return break contact CRBC is a normally open contact mounted on a frame member 423 which frame supports an operating pin 424 which is adapted to slide in an axial direction within the frame 423. The contact CRBC is biased into closed position when the high point of the actuator 419 engages a contact roller 426 and depresses a pivot finger 428 into contact with the operating pin 424.

The actuator 421 is adapted to engage a pivoted trip lever 430 and trip the lever into engagement with a pivoted contact finger 432 to depress an operating pin 434 and thereby open the normally closed carriage return final stop contact FSC. The trip lever 430 is normally biased in a counterclockwise direction by means of a spring 436 and is rotated in a clockwise direction by the actuator 421 to turn the high point of the trip lever 430 into engagement with a roller 438 at the free end of the contact finger 432.

It should be noted, particularly in respect to Fig. 30, that the intermediate shift-shaft 374 has attached thereto a shift contact bail 440 which alternately operates a shift contact SC as the platen mechanism is shifted from one position to the other. By reference to Fig. 34C, it will be seen that the shift contact SC is a 2-point contact, one of which is normally open, and the other of which is normally closed. In Fig. 34C, the upper normally closed contact point is connected to a shift-up switch SUS, while the lower normally open contact point of the shift contact pair SC is connected to a shift-down switch SDS.

Figure 1:
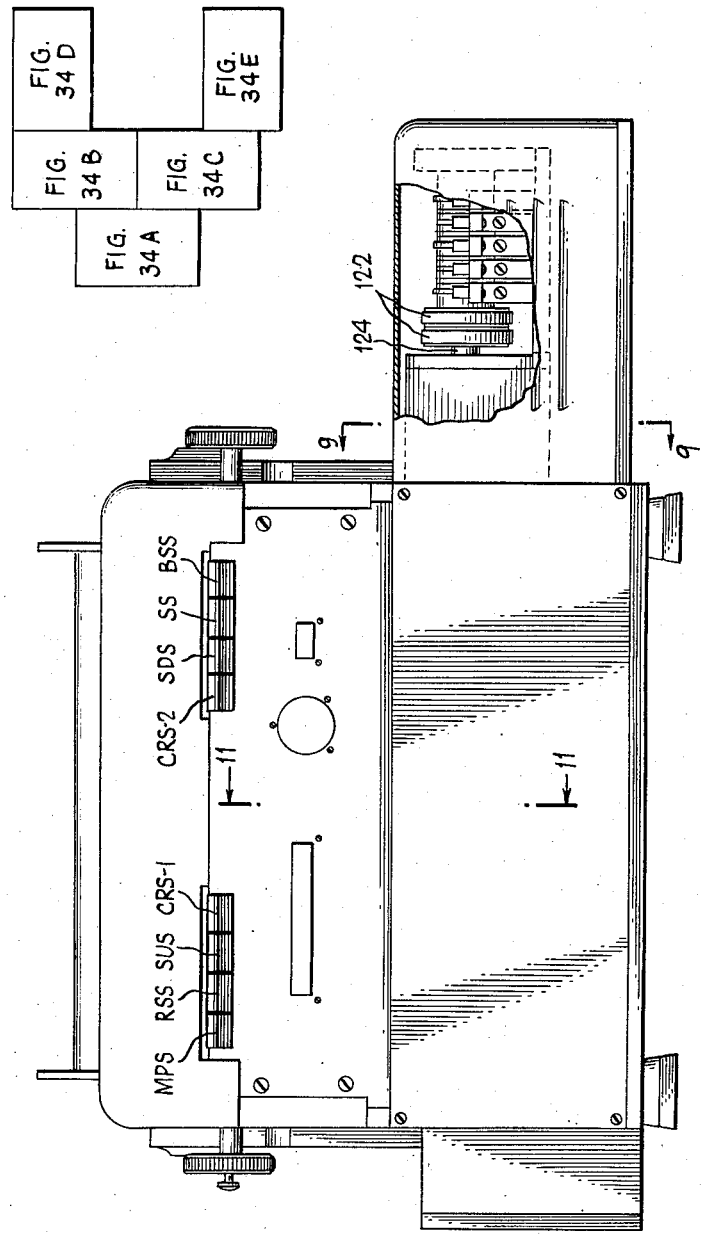
Figure 1 is a front elevational view of the power driven printer, part of the casing at the right being broken away to show a cam and cam contact assembly.
Figure 3:
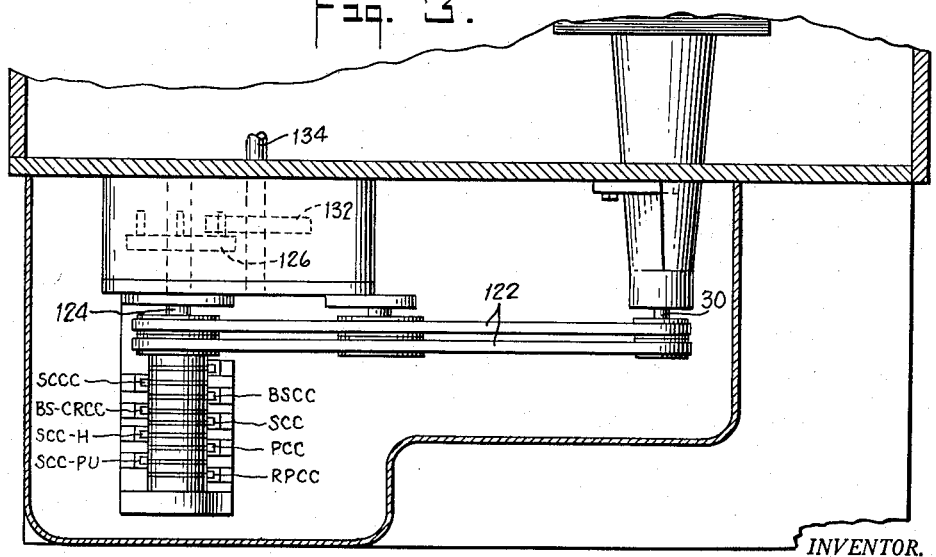
Fig. 3 is a sectional view on line 3—3 of Fig. 2 showing in plan the cam and cam contact assembly and related elements.

Manual control of the printer is vested in a plurality of switches having manual operating buttons accessible at the face panel of the printer, as shown in Fig. 1. Automatic operation of the printer is largely under control of a series of cam operated contacts located at opposite sides of the cam shaft 124, as best seen in Fig. 3.

Before pursuit of the electrical control system, the reader should familiarize himself with the location of the various manually operated switches and cam operated contacts. The physical arrangement of the manually operated switches is shown in Fig. 1 and comprises a motor power switch MPS, a run-step switch RSS, a shift-up switch SUS, a carriage release switch CRS–1, a carriage return switch CRS–2, a shift-down switch SDS, a space switch SS and a back space switch BSS. These several switches are oriented in the electrical control circuit as shown in Fig. 34C. The physical location of the cam operated contacts is best shown in Fig. 3, where these contacts are seen to consist of a back space cam contact BSCC, a space cam contact SCC, a pawl cam contact PCC, a reader pulse cam contact RPCC, a space cam contact (pickup) SCC-PU, a space cam contact (hold) SCC-H, a back space and carriage cam contact (pickup) BS-CRCC and a shift control cam contact SCCC. The orientation of these contacts circuitwise is shown in Fig. 34B.

Figure 2:
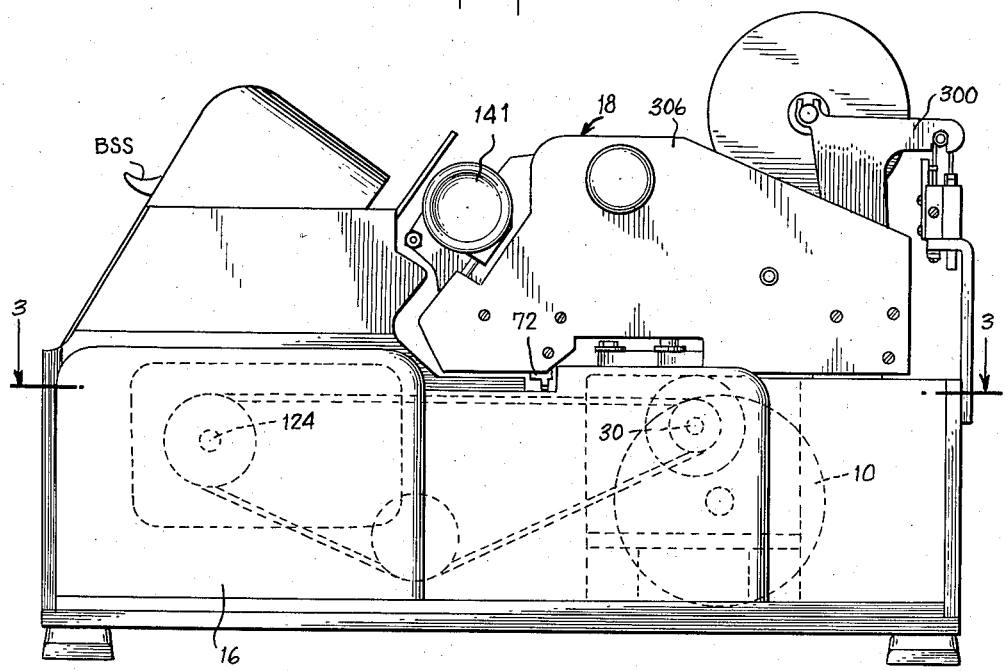
Fig. 2 is a side elevational view of the printer.

Terminals T28 and T29 (Fig. 34A) are in the power circuit of the motor 10 (Fig. 34C) and receive 115-volts 60-cycle alternating current from a suitable source. This same power line feeds a rectifier-transformer network, shown at the upper right in Fig. 34D, whose output is approximately 125-volts direct current, which constitutes the power supply for the relays and electromagnets in the printer. It will also be noted as the description proceeds that this voltage is fed to a clutch magnet of an associated tape reader TR (Fig. 34A), such as the magnet CM in Fig. 2 of my Patent No. 2,461,451 of February 8, 1949.

When the run-step switch RSS (Fig. 34C) is moved to the run position, a circuit is established to terminals T24 and T25 (Fig. 34A) from which the tape reader clutch magnet coil of the tape reader may be energized. The circuit can be traced from terminal T24 to the now closed run-step switch contact C24 and from thence to the normally closed contact of a stop-hole-step relay SHSR (Fig. 34C) to the normally closed contact of a line feed relay LFR (Fig. 34D) to the normally closed point of a carriage return-2 relay CRR-2 to a normally closed point of a carriage return-1 relay CRR-1 to a normally closed point of a back space-1 relay BSR-1 to a normally closed point of a back space-2 relay BSR-2, the reader pulse cam contact RPCC (Fig. 34B), and to the negative side of the current power source at terminal T25. When either the line feed relay LFR (Fig. 34D), the carriage return-2 relay CRR-2 (Fig. 34C), the carriage return-1 relay CRR-1, the back space-1 relay BSR-1 or the back space-2 relay BSR-2 are operated, the circuit to terminals T24 and T25 is broken with the result that no energizing circuit is available for the clutch magnet in the associated tape reader, such as in my aforesaid patent.

Figure 34B:
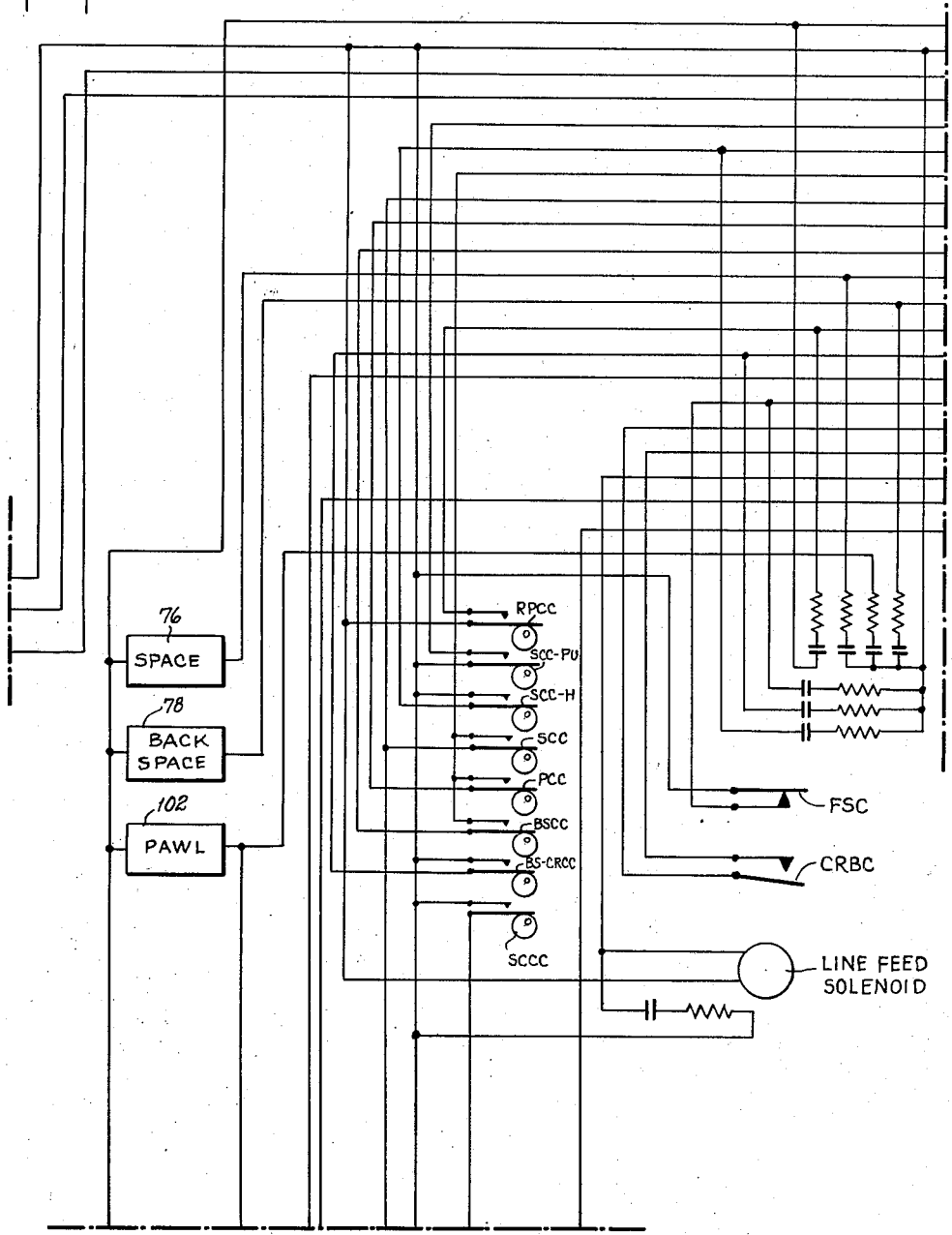
Figure 34C:
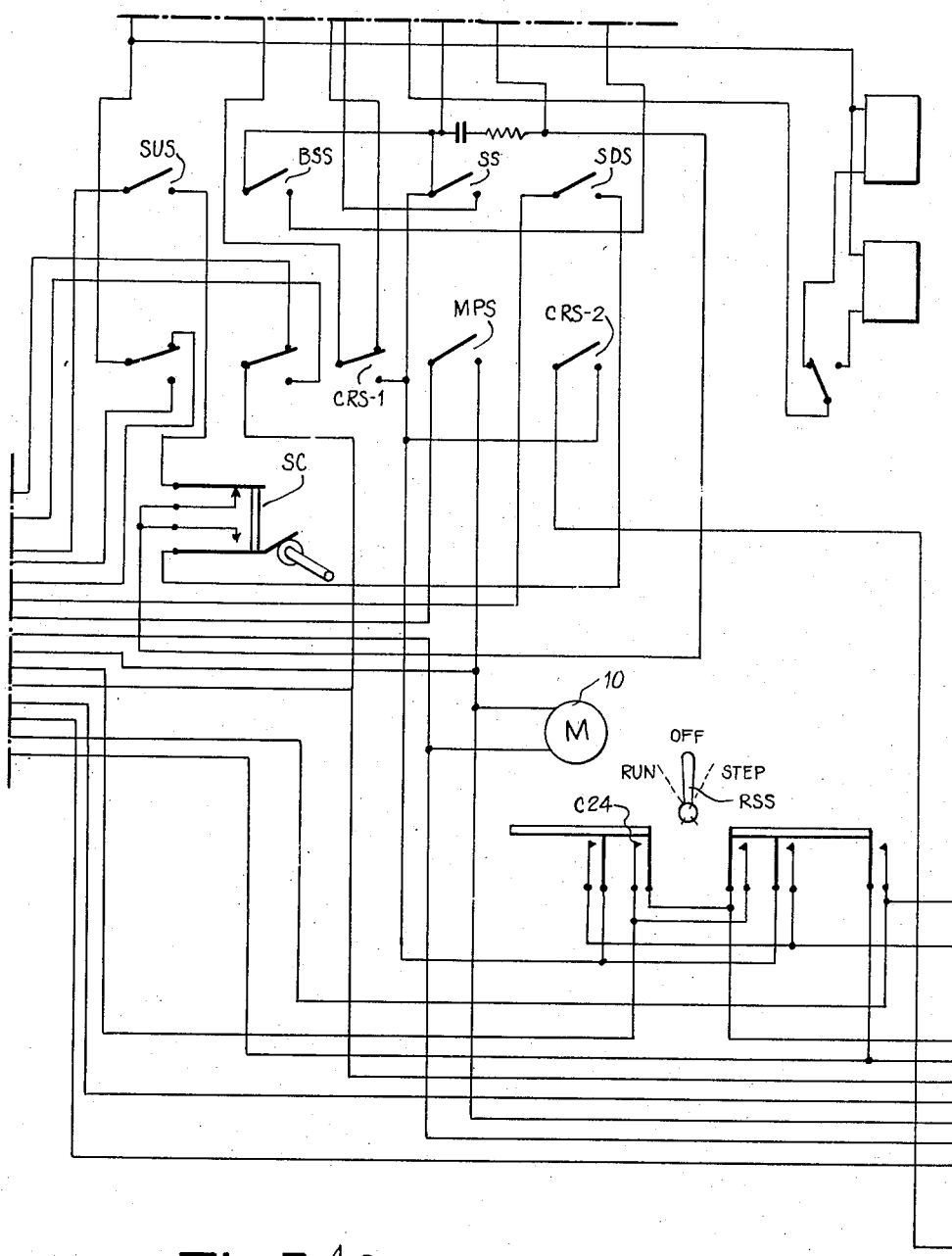

The reader pulse cam contact RPCC (Fig. 34B) is so timed that when it closes the tape reader clutch, current becomes available at terminals T24 and T25, a punched code is read in the reader, and a pulse is sent to the indicated key magnet, the series of which is diagrammatically represented by the several terminals 1 through 46 in Fig. 34A. When a key magnet is thus energized, the bell crank associated therewith is tripped at the proper time for the drive disc pin to pick up the bell crank and print the indicated character, in the manner heretofore described.

When the run-step switch RSS is moved to the step position (Fig. 34C), a circuit is also completed to the terminals T24 and T25, as described hereinabove for the condition wherein the step-run switch was in its run position. At the same time, a circuit is completed to the stop-hole-step relay SHSR (Fig. 34C) to open the circuit to the terminals T24 and T25, so that there is no power to the reader clutch magnet and the tape reader, therefore, stops at the completion of one cycle. This circuit is as follows: from a terminal T30 (Fig. 34A), through the run-step switch RSS to the coil of the stop-hole-step relay SHSR, and from thence to the negative side of the line. When a pulse is available at the terminal T30, the stop-hole-step relay SHSR operates thereby transferring its points and breaking the circuit to the terminals T24 and T25. Thus, no current is present at these terminals from which a reader clutch magnet coil can be energized.

When a stop-hole-code, which may be presumed to be a code with holes in the 1—4—5 and 6 positions transversely of a tape, is read in a tape reader, a signal is impressed on the stop-hole-step relay SHSR by way of a terminal T31. This signal operates the stop-hole-step relay, opening the circuit to the terminals T24 and T25. The stop-hole-step relay holds up until the run-step switch RSS is moved to its off position.

When a character is read from a punched tape in a tape reader such as in my aforesaid patent, the combinational code is translated and a single pulse representative of the particular character is transmitted to the respective key magnet terminals. A pulse received at a key magnet terminal in Fig. 34A, energizes the key magnet, attracting its armature and pushing rearwardly on the plunger to trip off the bell crank so that the typing of the character follows. This same pulse operates a space-1 relay SR-1 (Fig. 34C) to actuate the spacing mechanism each time a character is typed. The key magnet circuit extends from the key magnet common (Fig. 34A) through the coil of the space-1 relay SR-1 and to the negative side of the direct current line.

In order to control the movement of the carriage, the three coils 76, 78 and 102 in the electromagnetic escapement unit must be energized in the correct sequence and for very closely controlled periods of time. For forward spacing, as in typing, or for spacing between words, the space pick-up cam contact SCC-PU (Fig. 34B), the space hold cam contact SCC-H, the pawl cam contact PCC and the back space cam contact BSCC, together with the space-1 relay SR-1, a space-2 relay SR-2 and a space-3 relay SR-3 enter into the control of the escapement unit.

For typing, the operation is as follows: a selected key magnet is operated and the space-1 relay SR-1 is also operated since the coil of the relay is in series with the key magnet common. Normally open contacts of the space-1 relay SR-1 close to operate the space-2 relay SR-2 which is held up by means of a resistance-capacitance network until the space cam pick-up contact SCC-PU in series with the normally open contacts on the space-2 relay SR-2 closes to operate the space-3 relay SR-3. The space-3 relay SR-3 is held up through its normally open contacts and the space (hold) cam contact SCC-H until the spacing operation is completed, at such time the space (hold) cam contact SCC-H opens allowing the space-3 relay SR-3 to drop to normal unless the space (pickup) cam contacts SCC-PU is closed by the typing of another character, in which case the space-3 relay SR-3 remains energized.

Energization of the space-3 relay SR-3 closes a common circuit to the cam contacts SCC, PCC, BS and BSCC, so that the three coils 76, 78 and 102 in the escapement unit will be energized as their respective cam contacts are closed.

The pawl clutch coil 102 and the space clutch coil 76 are energized at substantially the same time by the closing of their respective cam contacts PCC and SCC. The pawl 108 (Fig. 8) is withdrawn from the detent rack 106, leaving the carriage free to move under the control of the space clutch. After the space clutch has driven the carriage for a predetermined length of time, the space cam contact SCC opens, deenergizing the clutch. Slightly before the space cam contact SCC opens, the back space cam contact BSCC closes so that the flux in the back space clutch coil 78 will be nearly maximum when the space clutch coil 76 is deenergized. The back space clutch then tends to drive the carriage in the reverse direction and the timing is so adjusted that the carriage is slowed down to zero velocity at the end of one space. The back space clutch coil 78 is deenergized just before the carriage reaches this point so that there will be no driving force on the carriage at the end of the space. The pawl cam associated with the pawl cam contacts PCC is so timed that the pawl coil 102 is deenergized and the pawl 108 is dropped into the teeth 106 of the rack as the carriage approaches the end of the space.

Two cam contacts are employed to control the space-3 relay SR-3 in order to allow time for this relay to drop out in case the carriage is not to be spaced in the next cycle. For spacing between words, the space signal impressed on the terminal T3 goes directly to the coil of the space-2 relay SR–2 which operates and holds until the space pick-up cam contacts SCC–PU close after which spacing is accomplished the same as during printing.

Figure 34D:
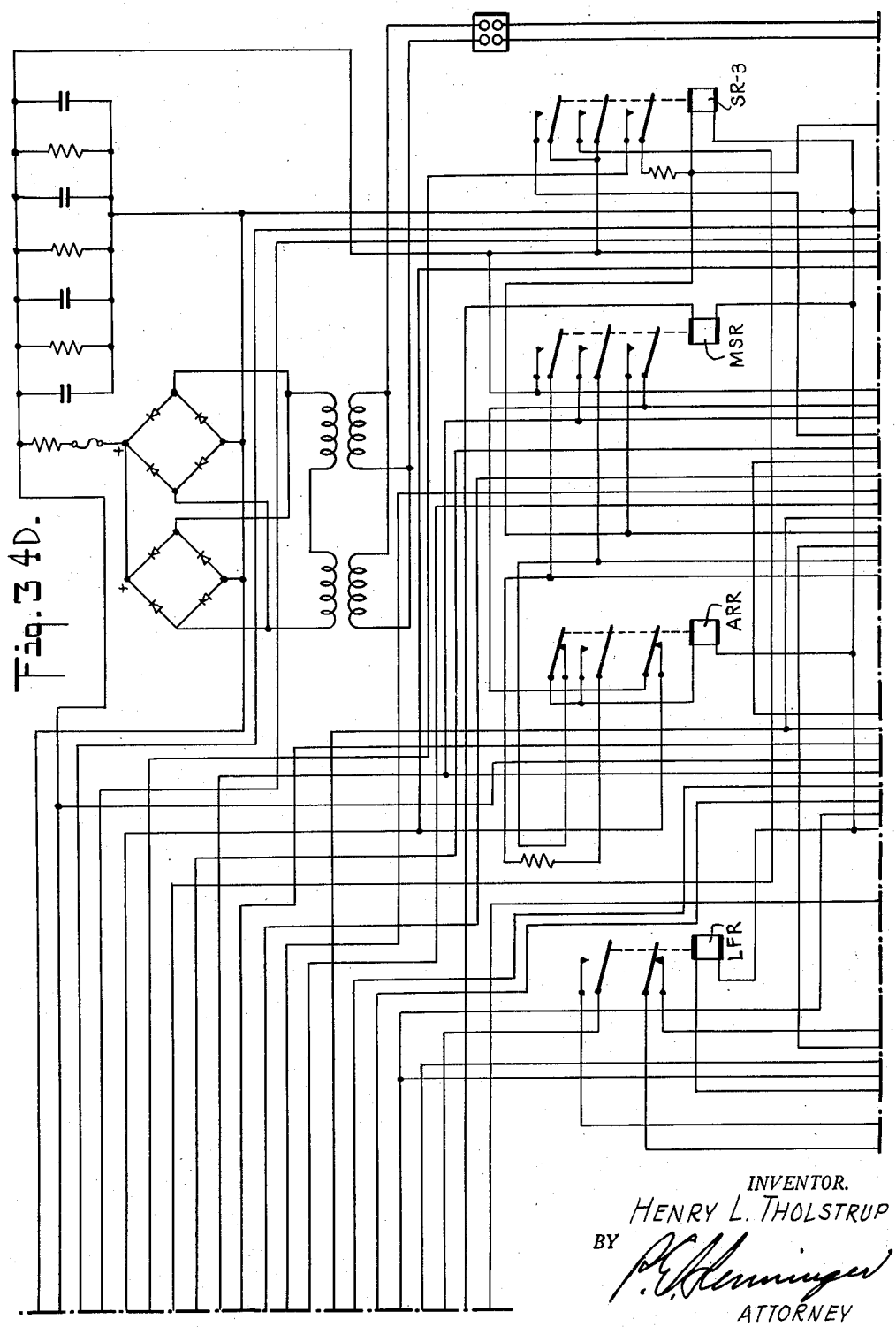

By reference to Fig. 1, it will be noted that the control panel contains a space switch SS. This is the same switch shown in Fig. 34C of the wiring diagram and is provided so that the carriage can be spaced under manual control of the operator. Closure of the space switch SS closes a circuit to the manual space relay MSR (Fig. 34D). When the manual space relay MSR is energized, a circuit is completed from the coil of the space-3 relay SR–3 through the normally open contact of the manual space relay MSR and a normally closed contact of an anti-repeat relay ARR (Fig. 34D) and to the space pick-up cam contacts SCC–PU, so that the space-3 relay SR–3 operates when the space pick-up cam contacts SCC–PU close and spacing proceeds as during the printing operation.

However, to prevent repeating of the spacing operation in case the manual space relay MSR is held operated for too long by reason of closure of the space switch SS, it is necessary for the anti-repeat relay ARR to open the circuit from the space pick-up cam contact SCC–PU to the coil of the space-3 relay SR–3. To accomplish this, the pulse from the pawl cam contact PCC is connected to the coil of the anti-repeat relay ARR through the normally open contact on the manual space relay MSR. When the pawl cam contact PCC is closed, the anti-repeat relay ARR operates to open the circuit from the space pick-up contact SCC–PU to the coil of the space-3 relay SR–3. The anti-repeat relay ARR locks up through a continuity transfer contact on the anti-repeat relay ARR and a normally open contact on the manual space relay MSR, whereby it is held operated until the space switch SS is released and the manual space relay MSR returns to normal.

The back spacing operation is controlled by the same cam contacts that are used for forward spacing in co-operation with the back space and carriage return pick-up cam contacts BS–CRCC. For the back spacing operation, the space-3 relay SR–3, the back space-1 relay BSR–1 and the back space-2 relay BSR–2 are also employed. In order to move the carriage backward, the space coil 76 of the space clutch and the back space clutch coil 78 of the scapement unit are energized in reverse sequence from that utilized during spacing in the forward direction. This is done by interchanging connections between the coils and the related cam contacts by means of the back space-2 relay BSR–2, so that the space cam contact SCC controls the back space coil 78 and the back space cam contacts BSCC control the space coil 76. When a back space signal is impressed on a terminal T18 from a back space code read in the tape reader, it effectively operates the back space-1 relay BSR–1 which is held energized by means of a resistance-capacitance network until the back space and carriage return pick-up cam contact BS–CRCC and the space pick-up can contact SCC–PU have closed. When the back space-1 relay BSR–1 operates, the circuit supplying the tape reader clutch magnet is broken and the tape reader stops until the back space function is completed. A circuit from the back space and carriage return pick-up cam contact BS–CRCC, through the normally open contact of the back space-1 relay BSR–1 to the coil of the back space-2 relay BSR–2 operates the back space-2 relay BSR–2 when the cam contacts close. Another circuit from the space pick-up cam contact SCC–PU through the normally open contacts of the back space-1 relay BSR–1 to the coil of the space-3 relay SR–3 effectively operates the space-3 relay SR–3. Since the back space-2 relay BSR–2 controls the reversing of the connections to the space coil 76 and the back space coil 78, this relay must be operated before the space-3 relay SR–3 operates and before the space cam contacts SCC and the back space cam contacts BSCC close. The timing of the back space and carriage return pick-up cam contacts BS–CRCC is so adjusted as to accomplish this. The back space-2 relay BSR–2 is held operated by means of a holding circuit through the normally open contact on the back space-2 relay BSR–2 and the normally open contact on the space-3 relay SR–3, so that it returns to normal when the space-3 relay SR–3 is deenergized by the opening of the space-hold cam contact SCC–H. As soon as the space-3 relay SR–3 operates, back spacing takes place in the same manner as spacing in the forward direction during a printing operation. When the back space-2 relay BSR–2 is deenergized, the circuit supplying power to the clutch magnet in the tape reader is again closed and the reader starts transmitting further signals.

Again by reference to Fig. 1, it will be seen that back spacing can also be accomplished under manual control by the operator by reason of the back space switch BSS on the control panel. This is the same switch as that shown in Fig. 34C of the drawing and comprises a single pole, momentary contact push-button switch. This switch controls a manual back space relay MBSR (Fig. 34C). Four circuits are closed through the four normally open contacts on the manual back space relay MBSR. These circuits are as follows:

(1) From the back space and carriage return pick-up cam contacts BS–CRCC through a normally open contact of the manual back space relay MBSR to the coil of the back space-2 relay BSR–2 so that the back space-2 relay BSR–2 is operated when the back space cam contact BSCC closes.

(2) From the space pick-up cam contact SCC–PU through the normally closed contact of the anti-repeat relay ARR, through the normally open contact of the manual back space relay MBSR and to the coil of the space-3 relay SR–3, so that the space-3 relay SR–3 is energized when the cam contact closes.

(3) From the pawl cam contact PCC through the normally open contact of the manual back space relay MBSR, through the normally closed side of the continuity transfer contact, of the anti-repeat relay ARR and to the coil of the anti-repeat relay. The anti-repeat relay ARR is thus energized when the pawl cam contact PCC closes, breaking the pick-up circuit to the space-3 relay SR–3.

(4) A holding circuit is established for the anti-repeat relay ARR from the coil of the anti-repeat relay through the normally open side of the continuity transfer contact, through the normally open contact of the manual back space relay MBSR and to the positive side of the direct current line.

The anti-repeat relay ARR remains energized thus preventing the space-3 relay SR–3 from remaining in operation for more than one cycle if the back space push button BSS is held closed more than the time required for one operation.

A carriage return signal from the tape reader is impressed on a terminal T15 and is effective to operate the carriage return-1 relay CRR–1. The carriage return-1 relay CRR–1 is held energized by means of a resistance-capacitance network until the carriage return-2 relay CRR–2 has been operated. When the carriage return-1 relay CRR–1 is energized, the circuit normally operating the tape reader clutch magnet is broken and the tape reading operation stops. When the carriage return-1 relay CRR–1 is operated, a circuit is completed from the direct current positive side through the back space and carriage return pick-up cam contact BS–CRCC, through the normally open contact of the carriage return-1 relay CRR–1 to the coil of the carriage return-2 relay CRR–2 to operate the carriage return-2 relay CRR–2 when the back space and carriage return pick-up cam contact BS–CRCC is closed. When the carriage return-2 relay CRR–2 is energized, the carriage return-3 relay CRR–3 is operated through the normally open contact of the carriage return-2 relay CRR–2. The carriage return-2 relay CRR–2 is held up through the normally open contact of the carriage return-3 relay CRR–3 which is in series with a normally closed carriage final stop contact, which is shown in its circuit orientation in Fig. 34B and also in Figs. 31 and 32. Operation of the carriage return-2 relay CRR–2 energizes the back space coil 78 in the escapement unit by means of a circuit extending from the direct current positive source through the normally open contact of the carriage return-2 relay CRR–2, through the normally closed side of the transfer contact of the back space-2 relay BSR–2 and to the back space coil 78. Energizing the back space coil 78 results in the return of the carriage. The carriage return-2 relay CRR–2 also closes a circuit through which the pawl coil 102 of the escapement unit is energized to release the carriage for return movement.

As the carriage approaches its home position, it closes a carriage return break contact CRBC which is oriented in the circuit in Fig. 34B and which is also shown in Figs. 31 and 32. It may be noted that the carriage return break contact CRBC is a normally open contact which is closed by the operating element 418, as shown in Fig. 32. Closure of the carriage return break contact CRBC effectively operates a carriage return-4 relay CRR–4 (Fig. 34C) by means of a circuit from the direct current positive side, through the normally closed carriage return final stop contact FSC, through the normally open contact of the carriage return-3 relay CRR–3, through the carriage return break contact CRBC and to the coil of the carriage return-4 relay CRR–4. The carriage return-4 relay CRR–4 is maintained energized for approximately 80 milliseconds by means of a resistance-capacitance network.

When the carriage return-4 relay CRR–4 is operated, a normally open contact closes to operate the back space-2 relay BSR–2. Operation of the back space-2 relay transfers power from the back space coil 78 to the space coil 76 in the escapement unit, so that the space clutch acts as a brake to retard the movement of the carriage whereby the carriage is at substantially zero velocity when it reaches the final stop. When the carriage approaches its home position, the operating element 420 of Fig. 32 effectively opens the normally closed carriage return final stop contact FSC. This breaks the circuit to the coils of the carriage return-2 relay CRR–2 and the back space-2 relay BSR–2, allowing them to drop and thereby de-energizing the pawl coil 102 and the space coil 76. The carriage return-3 relay CRR–3 drops out when the contacts of the carriage return-2 relay CRR–2 opens. The carriage return-4 relay CRR–4 drops after the carriage return final stop contact FSC has opened.

The carriage return-4 relay CRR–4 is controlled by a resistance-capacitance network in order to prevent the carriage from reversing and jamming at the left end of carriage travel in case the carriage does not reach the carriage return final stop contact FSC and open the same, as may be the case during a very short carriage return, for example. The carriage return-4 relay CRR–4 will drop out allowing the back space-2 relay BSR–2 to drop and restore power to the back space coil 78 before the carriage reaches the left end of its return movement.

The circuits are also conditioned for manual control of the carriage return function. To this end, the control panel includes the carriage return switch CRS-2 which is the same as the carriage return switch CRS-2 shown in the circuit of Fig. 34C. Closure of the carriage return switch CRS-2 is effective to control a manual carriage return relay MCRR (Fig. 34C) which conditions circuits to operate the carriage return-1 relay CRR–1. The circuit involved extends from the positive side of the direct current line through the normally open contact of the manual carriage return relay MCRR, through a normally closed contact of a carriage return anti-repeat relay CRAR (Fig. 34C) and to the coil of the carriage return-1 relay CRR–1. The carriage return-1 relay CRR–1 remains operated as long as the carriage return switch CRS–2 is closed or until the carriage return anti-repeat relay CRAR is operated. After the carriage return-1 relay CRR–1 is operated, the carriage return function proceeds the same as when operated automatically under control of a carriage return signal from a tape reader.

To prevent repeated operation of the manual carriage return function in case the carriage return switch CRS is held down too long, the first closing of the back space and carriage return pick-up cam contacts BS–CRCC after the carriage return-1 relay CRR–1 is operated causes a pulse to be transmitted to the coil of the carriage return anti-repeat relay CRAR which operates and holds until the carriage return switch CRS is released. The carriage return anti-repeat circuit is as follows: from the direct current positive line through the back space and carriage return pick-up cam contact BS–CRCC to the normally open contact of the carriage return-1 relay CRR–1, to the normally open contact of the manual carriage return relay MCRR and to the coil of the carriage return anti-repeat relay CRAR. The carriage return anti-repeat relay is held up through one of its normally open contacts and a normally open contact of the manual carriage return relay MCRR which is connected to the positive side of the direct current line. Operation of the carriage return anti-repeat relay CRAR breaks the circuit from the carriage return switch CRS to the carriage return-1 relay CRR–1 so that the carriage return-1 relay drops out and prevents carriage return-2 relay CRR–2 from being operated again by the back space and carriage return pick-up cam contacts BS–CRCC in case the manual carriage return switch CRS-2 is held down after the carriage has returned to its home position.

It will be remembered that the pawl 108 is in engagement with the teeth 106 of the escapement rack whenever the printer is at rest, the pawl being withdrawn to free the carriage only when the pawl clutch coil 102 is energized. In order to permit the operator to release the carriage and position it manually, it is necessary to operate the carriage release switch CRS–1. This is one of the control panel switches and is shown in Fig. 34C of the circuit diagram. Operation of the switch CRS–1 interrupts the normal control circuit from the carriage return-2 relay CRR–2 to the pawl clutch coil 102 and connects the pawl coil 102 to the positive side of the direct current line to energize the coil for as long as the switch CRS–1 is operated.

The case shifting operation, as controlled by signals from a tape reader, requires no more time than the typing of a character; therefore, special delay circuits are not required in connection with the shift function. The common from the shift key magnets is brought out separately to the coil of a function step relay FSR, since the space function controlled by the character key magnet common must not be allowed to initiate a case shifting operation. Manual shifting into upper or lowercase, can also be accomplished by operating either the shift-up switch SUS or the shift-down switch SDS on the control panel, as shown in Fig. 1, and as shown in the circuit diagram of Fig. 34C. Manual control of platen shifting requires some means for timing the pulse to the shift key magnets at the correct time for engaging the drive disc. Some means must also be provided to prevent repeating of the shift operation when not desired. A properly timed cam contact, the manual shift control cam contact SCCC, provides the timed operating pulse and a shift control contact switch SC operated from the intermediate shift-shaft, as shown in Fig. 30, effectively prevents repeated operations. The circuit involved is from the positive side of the direct current line through the manual shift control cam contact SCCC, to the switch SC, from the switch SC to the shift-up switch SUS and to the shift-up key magnet, and also from the shift control switch SC to the shift-down switch SDS, and to the shift-down key magnet. The position of the platen and the shift mechanism determines the position of the switch SC and which of the shift magnets will be operated. If a platen is up as in uppercase printing, the shift-down magnet will operate, and if the platen is down, as in lowercase printing, the shift-up magnet will operate.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

What is claimed is:

1. In a power operated typewriter having a base structure and a carriage adapted to reciprocate on said base structure, a power shaft in said base structure, a power transmission device having a forward drive gear and a reverse drive gear connected to said power shaft, an escapement rack fixed to said carriage, electromagnetic clutch means for selectively connecting said escapement rack to said forward and reverse drive gears, an electrical control circuit including a pair of circuit breakers for said electromagnetic clutch means and cam means connected for rotation with said power shaft for operating said circuit breakers for timing the connection of said rack to said gears.

2. In a power operated typewriter having a base structure and a carriage adapted to reciprocate on said base structure, a power shaft in said base structure, a power transmission device having a forward drive gear and a reverse drive gear connected to said power shaft, an escapement rack fixed to said carriage, means for selectively connecting said escapement rack to said forward and reverse drive gears, a latch pawl normally engaged with said escapement rack, means for withdrawing said pawl from engagement with said rack, and means connected to said power shaft for timing the connection of said rack and said gears and for initiating said withdrawing means.

3. In a power operated typewriter having a base structure and a carriage adapted to reciprocate on said base structure, a power shaft in said base structure, a power transmission device having a forward drive gear and a reverse drive gear connected to said power shaft, and escapement rack fixed to said carriage, electromagnetic means for selectively connecting said escapement rack to said forward and reverse drive gears, a latch pawl normally engaged with said escapement rack, electromagnetic means for withdrawing said pawl from engagement with said rack, and means connected to said power shaft for energizing said electromagnetic drive gear connecting means and for energizing said electromagnetic pawl withdrawing means.

4. In a power operated typewriter having a base structure and a carriage adapted to reciprocate on said base structure, a power shaft in said base structure, a power transmission device having a forward drive gear and a reverse drive gear connected to said power shaft, an escapement rack fixed to said carriage, means for selectively connecting said escapement rack to said forward and reverse drive gears, a latch pawl normally engaged with said escapement rack, electromagnetic means for withdrawing said pawl from engagement with said rack, and means connected to said power shaft for energizing said pawl withdrawing means.

5. In a power operated typewriter having a base structure and a carriage adapted to reciprocate on said base structure, a motor driven shaft in said base structure, a power transmission device having a forward drive gear connected to said motor driven shaft, an escapement rack and a reverse drive gear fixed to said carriage, electromagnetic means for connecting said escapement rack to said reverse drive gear for effecting a return movement of said carriage, means carried by said carriage for de-energizing said electromagnetic means to disable the connection between said escapement rack and said reverse drive gear as said carriage approaches its returned position, and means operable also by said carriage for substantially simultaneously engaging said escapement rack and said forward drive gear.

6. In a power operated typewriter having a base structure and a carriage adapted to reciprocate on said base structure, a motor driven shaft in said base structure, a power transmission device having a forward drive gear and a reverse drive gear connected to said motor driven shaft, an escapement rack fixed to said carriage, electromagnetic means for connecting said escapement rack to said reverse drive gear for effecting a return movement of said carriage, means carried by said carriage for de-energizing said electromagnetic means to disable the connection between said escapement rack and said reverse drive gear as said carriage approaches its returned position, second electromagnetic means for connecting said escapement rack to said forward drive gear, and means operable also by said carriage for substantially simultaneously energizing said second electromagnetic means for engaging said escapement rack and said forward drive gear.

7. In a power operated typewriter having a base structure and a carriage adapted to reciprocate on said base structure, a motor driven shaft in said base structure, a power transmission device having a forward drive gear and a reverse drive gear connected to said motor driven shaft, an escapement rack fixed to said carriage, electromagnetic means for connecting said escapement rack to said reverse drive gear for effecting a return movement of said carriage, a circuit breaker adapted to be opened by said carriage for de-energizing said electromagnetic means to disable the connection between said escapement rack and said reverse drive gear as said carriage approaches its returned position, second electromagnetic means for connecting said escapement rack to said forward drive gear, and a circuit maker adapted to be closed by said carriage for substantially simultaneously energizing said second electromagnetic means for engaging said escapement rack and said forward drive gear.

References Cited in the file of this patent

UNITED STATES PATENTS

| | | |
|---|---|---|
| 1,040,658 | Endemann | Oct. 8, 1912 |
| 1,192,459 | Roberts | July 25, 1916 |
| 1,469,778 | Crawley | Oct. 9, 1923 |
| 2,028,747 | Horton et al. | Jan. 28, 1936 |
| 2,217,221 | Ganger | Oct. 8, 1940 |
| 2,331,827 | Dennis | Oct. 12, 1943 |
| 2,362,138 | Kavle | Nov. 7, 1944 |
| 2,366,368 | Sundstrand et al. | Jan. 2, 1945 |
| 2,383,257 | Kittel | Aug. 21, 1945 |
| 2,709,511 | Dicke | May 31, 1955 |

UNITED STATES PATENT OFFICE
CERTIFICATE OF CORRECTION

Patent No. 2,900,066 August 18, 1959

Henry L. Tholstrup

It is hereby certified that error appears in the printed specification of the above numbered patent requiring correction and that the said Letters Patent should read as corrected below.

Column 5, line 68, for "a eye" read -- an eye --; column 15, line 48, for "scapement" read -- escapement --; line 60, for "can" read -- cam --; column 20, line 10, strike out "connected to said motor driven shaft, an escapement rack" and insert the same after "gear" in line 11, same column.

Signed and sealed this 12th day of April 1960.

(SEAL)
Attest:

KARL H. AXLINE
Attesting Officer

ROBERT C. WATSON
Commissioner of Patents